United States Patent
Prefontaine et al.

(10) Patent No.: US 9,918,583 B2
(45) Date of Patent: *Mar. 20, 2018

(54) METHOD FOR GENERATION OF SUPERHEATED STEAM FOR THE PREPARATION OF A BEVERAGE

(71) Applicant: Seattle Espresso Machine Corporation, Seattle, WA (US)

(72) Inventors: Jason Camille Prefontaine, Bellevue, WA (US); Devin Walker, Shoreline, WA (US)

(73) Assignee: Seattle Espresso Machine Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,094

(22) Filed: Apr. 27, 2017

(65) Prior Publication Data

US 2017/0332826 A1    Nov. 23, 2017

Related U.S. Application Data

(63) Continuation of application No. 15/161,036, filed on May 20, 2016.

(51) Int. Cl.
  A47J 31/30    (2006.01)
  A47J 31/56    (2006.01)
  A23F 5/24    (2006.01)

(52) U.S. Cl.
  CPC ............ *A47J 31/30* (2013.01); *A23F 5/24* (2013.01); *A47J 31/56* (2013.01)

(58) Field of Classification Search
  CPC .............. A47J 31/30; A47J 31/56; A23F 5/24
  See application file for complete search history.

(56) References Cited

U.S. PATENT DOCUMENTS 2,906,193 A * 9/1959 McCauley ............... A47J 31/41
                                                          34/562
4,032,748 A * 6/1977 Vischer .................. A47J 31/542
                                                          138/103

(Continued)

FOREIGN PATENT DOCUMENTS

FR        2465451       *  3/1981
FR        2544187       * 10/1984

(Continued)

OTHER PUBLICATIONS

English Translation for JP2011125221 published Jun. 2011.*
English Translation for FR25544187 published Oct. 1984.*
English Translation for FR2465451 published Mar. 1981.*

*Primary Examiner* — Anthony Weier
(74) *Attorney, Agent, or Firm* — Ellen M. Bierman; Mark P. Walters; Lowe Graham Jones PLLC

(57) ABSTRACT

Assemblies, machines, systems, and methods for the generation of superheated are discussed A steam super-heat assembly is employed for generating superheated steam for the preparation of coffee-based beverages. The assembly includes a body that includes an internal cavity, a heating element that includes heating surfaces positioned within the internal cavity, and a flow path within the internal cavity. The body also includes an input that enables fluid access into the internal cavity and an output that enables fluid egress out of the internal cavity. The heating element heats the heating surfaces of the heating element. The flow path enables fluid to flow from the input, through the internal cavity of the body, and to the output of the body. The heating surfaces form a portion of the flow path. When the fluid flows through the internal cavity, the fluid is in direct physical contact with the heating surfaces.

20 Claims, 11 Drawing Sheets

(56) References Cited

U.S. PATENT DOCUMENTS

| | | | |
|---|---|---|---|
| 4,470,999 A * | 9/1984 | Carpiac | A23F 5/243 141/1 |
| 4,714,011 A * | 12/1987 | Ly | A47J 31/005 99/279 |
| 5,335,588 A * | 8/1994 | Mahlich | A47J 31/4489 261/121.1 |
| 5,357,848 A * | 10/1994 | Eugster | A47J 31/0573 99/279 |
| D395,975 S | 7/1998 | Munoz | |
| 6,161,469 A * | 12/2000 | Rolla | A47J 31/54 99/293 |
| D497,510 S | 10/2004 | Comorera Ivanov | |
| 6,862,978 B1 | 3/2005 | Fogagnolo | |
| 6,875,317 B1 * | 4/2005 | Toyoda | C10B 53/00 201/21 |
| D551,487 S | 9/2007 | Beretta | |
| D573,393 S | 7/2008 | Trazzi | |
| D589,739 S | 4/2009 | Giugiaro | |
| D592,003 S | 5/2009 | Giugiaro | |
| 8,056,469 B2 * | 11/2011 | Sala | A47J 31/402 99/290 |
| D672,998 S | 12/2012 | Bonetto | |
| D695,052 S | 12/2013 | Ottavi | |
| D740,600 S | 10/2015 | Damon | |
| 9,149,148 B2 | 10/2015 | Jaccard et al. | |
| D758,778 S | 6/2016 | Bonetto | |
| 9,364,117 B2 | 6/2016 | Prefontaine | |
| 9,433,318 B2 | 9/2016 | Prefontaine et al. | |
| 2005/0254803 A1 * | 11/2005 | Ono | A23L 3/165 392/405 |
| 2008/0000357 A1 * | 1/2008 | Yang | A47J 31/0684 99/279 |
| 2008/0173260 A1 * | 7/2008 | Lange | F28D 15/0241 122/31.1 |
| 2008/0216665 A1 * | 9/2008 | Hoehne | A47J 31/542 99/293 |
| 2010/0011629 A1 * | 1/2010 | Pieters | D06F 75/12 38/77.6 |
| 2010/0112165 A1 * | 5/2010 | Masciandaro | A47J 31/405 426/433 |
| 2011/0048243 A1 * | 3/2011 | Bambi | A47J 31/002 99/300 |
| 2012/0118164 A1 * | 5/2012 | Tonelli | A47J 31/4485 99/280 |
| 2015/0064323 A1 | 3/2015 | Prefontaine | |
| 2015/0110935 A1 | 4/2015 | Prefontaine | |
| 2016/0287007 A1 | 10/2016 | Barnett et al. | |
| 2016/0353786 A1 * | 12/2016 | McHugh | A21D 2/26 |
| 2017/0098483 A1 * | 4/2017 | Zhan | G21C 15/14 |
| 2017/0122552 A1 * | 5/2017 | Zhang | F22D 1/003 |

FOREIGN PATENT DOCUMENTS

| | | | |
|---|---|---|---|
| GB | 432075 | * | 7/1935 |
| JP | 2011125221 | * | 6/2011 |

* cited by examiner

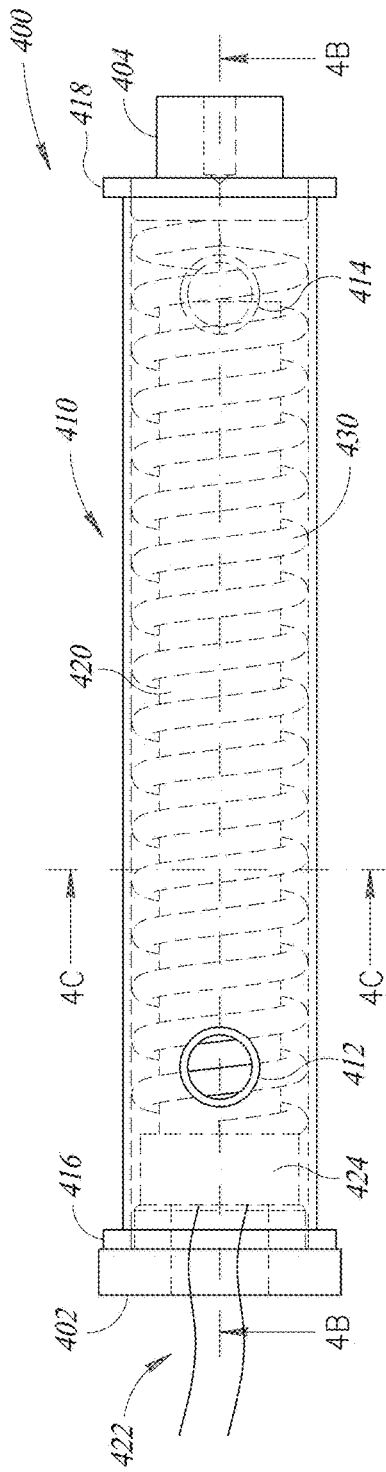
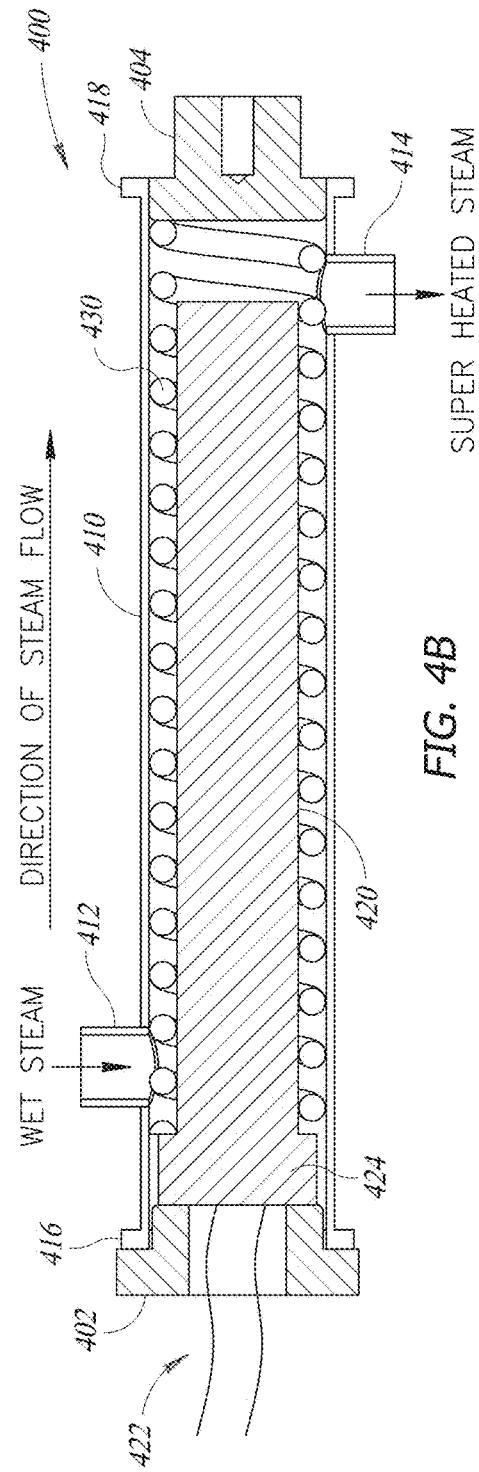
FIG. 4A
FIG. 4B

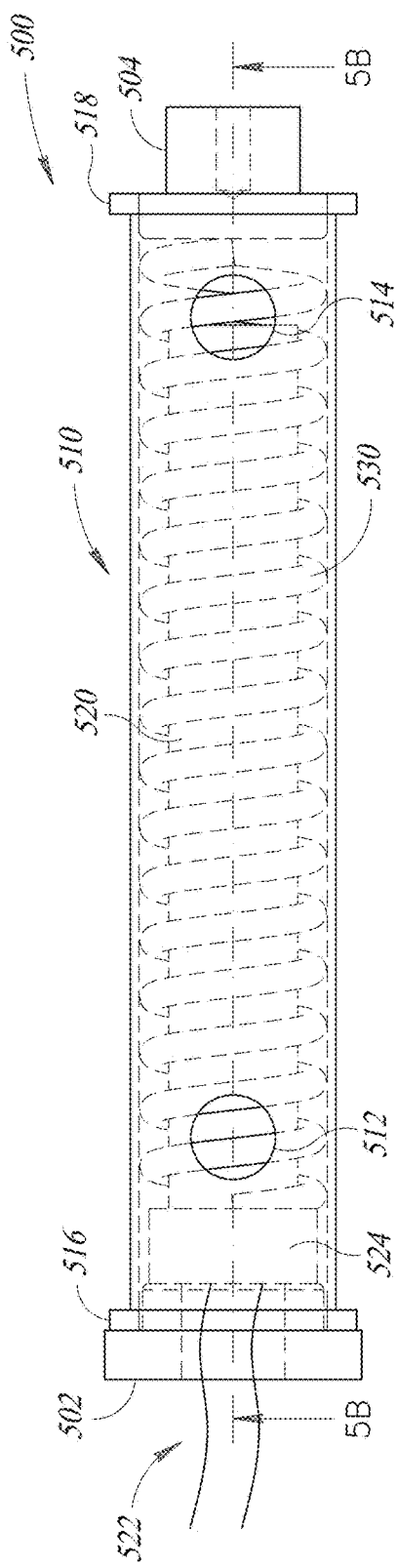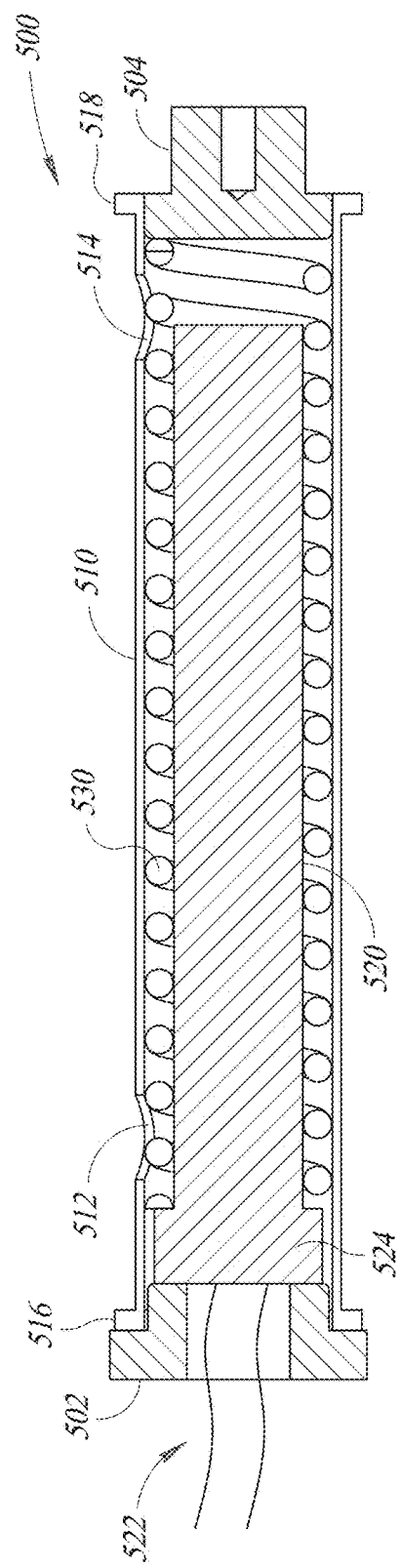
FIG. 5A
FIG. 5B

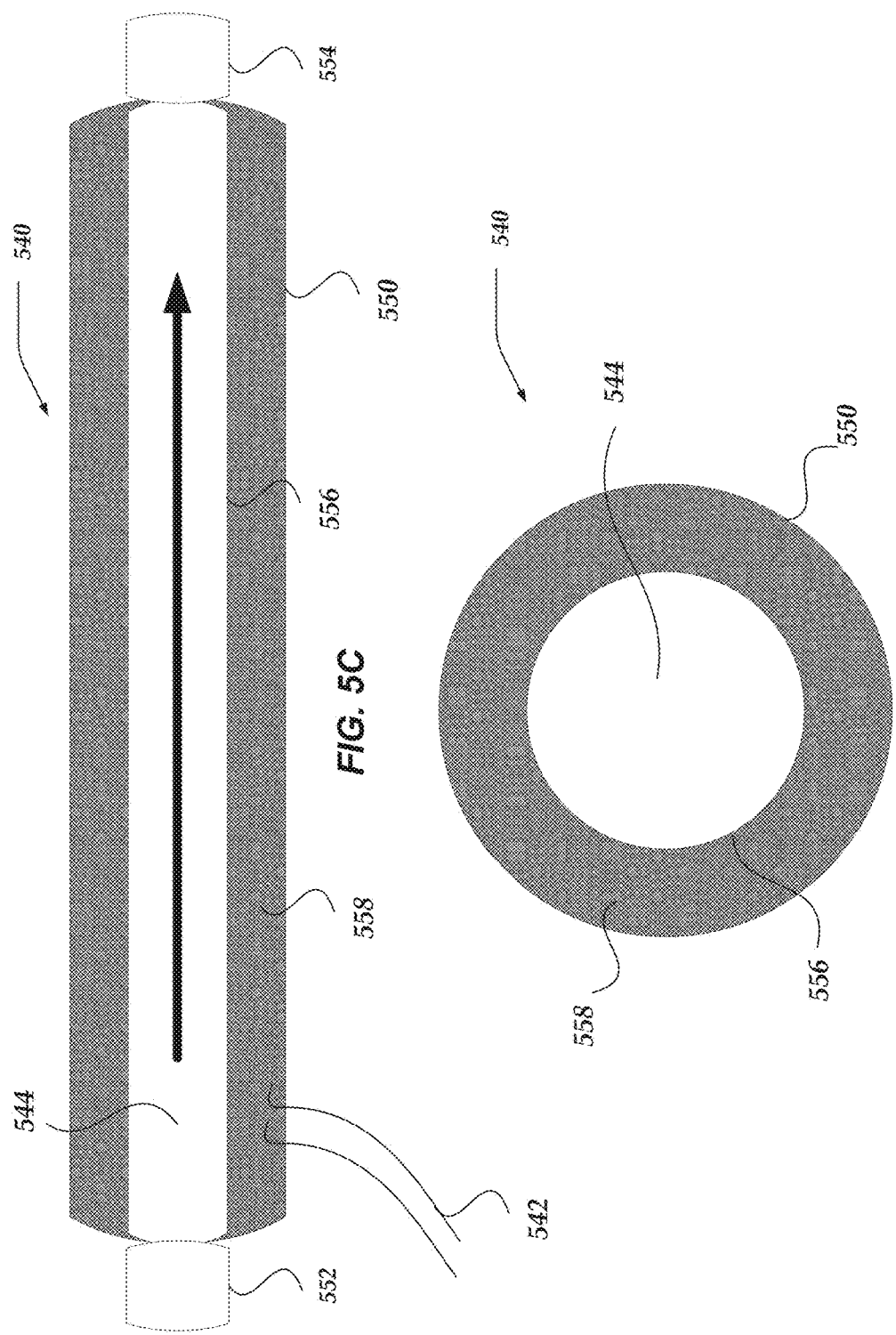

METHOD FOR GENERATION OF SUPERHEATED STEAM FOR THE PREPARATION OF A BEVERAGE

PRIORITY CLAIM

This application is a continuation of U.S. patent application Ser. No. 15/161,036, filed on May 20, 2016, the contents of which are hereby incorporated by reference.

FIELD OF THE INVENTION

The present invention relates generally to the generation of steam, and more particularly, but not exclusively, to generating superheated steam for the preparation of a beverage, including but not limited to a coffee-based beverage, a tea-based beverage, or a chai-based beverage.

BACKGROUND OF THE INVENTION

Espresso is a concentrated coffee beverage brewed by forcing heated pressurized water through ground coffee beans. By forcing heated pressurized water through ground coffee beans, the beverage produced during an espresso brewing process absorbs more of the flavor producing components, such as the oils and various solids found in the beans. As compared to coffee beverages produced by other brewing methods, such as drip brewing, an espresso brewing process results in a thicker beverage with a creamy texture and a concentrated and complex taste profile. Also, because the water is under pressure, the coffee grounds used for espresso may be ground finer than the coffee grounds used for other brewing processes. This results in greater surface area of coffee grounds for which the pressurized water can come into contact with, absorbing more of the flavor producing chemicals from within the grounds. Furthermore, for an espresso brewing process, the grounds may be tamped to provide a greater stacking efficiency of the grounds, which promotes the water's penetration of the grounds, resulting in still greater flavor extraction.

Because of its relatively high concentration, as compared to other coffee beverages, espresso may be served in a small portion referred to as a shot, measuring approximately 1 U.S. fluid ounce. Espresso may also be served in integer multiples of a shot, such as a double shot or a triple shot. Espresso is typically prepared using a specialized coffee machine, referred to as an espresso machine. Brewing a shot of espresso may be referred to as pulling a shot of espresso because some espresso machines require a user of the machine, or a barista, to pull a spring loaded lever that is attached to a piston, where pressure created by the piston forces the water through the coffee grounds. Although the construction of espresso machines may vary, the machines are often loosely categorized by the drive mechanism used to produce the required pressure. One popular method used to produce the pressure is to employ a motor driven pump. Machines that employ such a pump are often collectively referred to as pump-driven, or simply pump espresso machines.

Espresso is a popular beverage worldwide. In addition to serving espresso as a shot, espresso may be used as a base for other popular coffee beverages, such as cappuccinos, lattes, macchiatos, and americanos. Some preparations of espresso based beverages may use wet steam to heat and/or froth milk. Many espresso machines are able to supply the heat and pressure required to brew espresso. In addition, some machines may supply heat and pressure to generate the wet steam that is used in the preparation of various espresso based beverages. Thus, it is with respect to these and other considerations that the present invention has been made.

SUMMARY OF THE INVENTION

Various embodiments are directed towards assemblies, machines, systems, and methods for the generation of superheated or dry steam. Various embodiments include a steam super-heat assembly for generating steam for the preparation of a beverage. In some non-limiting exemplary embodiments, the beverage may be a coffee-based beverage. However, in other embodiments, the beverage may include a base that is not coffee. For instance, the beverage may be a tea- or chai-based beverage. The superheated steam may be employed in the preparation of virtually any beverage.

The assembly may include a body that includes an internal cavity, a heating element that includes heating surfaces positioned within the internal cavity of the body, and a flow path within the internal cavity. The body may further include an input that enables fluid access into the internal cavity and an output that enables fluid egress out of the internal cavity. The heating element may be configured and arranged to heat the one or more heating surfaces. The flow path enables fluid to flow from the input, through the internal cavity of the body, and to the output of the body. A portion of the heating surfaces of the heating element form a portion of the flow path. When the fluid flows through the internal cavity of the body, a portion of the fluid is in direct physical contact with the heating surfaces.

In some embodiments, the assembly may further includes a helical member positioned within the internal cavity. A portion of the helical member may form a portion of the flow path. Accordingly, the flow path may be a helical flow path. The body, the heating element, and the helical member may be concentric about the longitudinal axis of the body. The helical member may be laterally intermediate the body and the heating element. In at least one embodiment, the helical member restricts a longitudinal flow of the fluid through the internal cavity of the body. The helical member may be a coil spring that surrounds the one or more heating surfaces of the heating element. The heating element may be a rod-shaped heating element. The heating element may extend in a longitudinal direction of the internal cavity of the body.

In various embodiments, the assembly further includes a first and a second end cap. The first end cap may be positioned on a first longitudinal end of the body. The second end cap may be positioned on a second longitudinal end of the body. The input and the output may be longitudinally intermediate the first and the second end caps.

Various embodiments are directed towards a machine that is enabled to brew a beverage and generate vaporized fluid. The beverage may be, but is not limited to a coffee-based beverage. In at least one embodiment, the beverage may be a brewed beverage. In various embodiments, the machine includes a steam tank that partially vaporizes the fluid, a super-heater assembly that is downstream from the steam tank, and a steam wand that is downstream from the super-heater assembly. In some embodiments, the fluid is not completely vaporized in the steam tank. The super-heater assembly receives the partially vaporized fluid. The super-heater assembly may include a heating element and a flow path. The flow path is in thermal contact with the heating element. The partially vaporized fluid flows through the flow path and is further vaporized. In some embodiments, the vaporization of the fluid is completed in the flow path. In at least one embodiment, superheated steam or dry steam, is generated in the flow path. The steam wand may provide the further vaporized fluid to a user of the machine.

In various embodiments, the machine may further include a valve between the steam tank and the super-heater assembly. The valve regulates a flow rate of the further vaporized fluid that is provided to the user. The valve may regulate the flow rate of the further vaporized fluid by at least pulsing between an open state and a closed state. The valve may be a proportional valve.

In some embodiments, the super-heater assembly further includes a body that houses the heating element and the flow path and a thermal insulator. The thermal insulator partially surrounds the body. The thermal insulator partially thermally insulates the body, the heating element, and the flow path from an ambient environment. The assembly may further include a helical member. The helical member at least partially forms the flow path. The flow path may be a helical flow path surrounding the heating element. In some embodiments, the heating element forms the flow path. When the partially vaporized fluid flows through the flow path, the partially vaporized fluid is in direct physical contact with the heating element and is further vaporized.

In some embodiments, the machine may further includes a thermocouple and a controller. In some embodiments, the controller may be a processor device, such as a microcontroller, a microprocessor, a central processing unit (CPU), or the like. A controller may include a logic device, such as but not limited to an application specific integrated circuit (ASIC), field programmable gate array (FPGA), or the like. The thermocouple may be in thermal contact with at least a portion of the super-heater assembly. The thermocouple may be enable to generate a signal based on a temperature of a portion of the super-heater assembly. The controller may receive the signal. The controller may adjust a temperature of the heating element based on a difference between the temperature of the portion of the super-heater assembly and a temperature threshold. Accordingly, the controller and thermocouple may work together to generate and respond to thermostatic feedback.

Various embodiments are directed towards a system for an espresso machine. The system may produce or generate superheated steam. Thus, the system may be a steam system. The system may include a resistive heating element, a helical flow path positioned around the resistive heating element, and a steam output in fluid communication with and downstream from the helical flow path. The helical flow path may receive wet steam produced in the espresso machine. The helical flow path may expose the wet steam to the resistive heating element. The resistive heating element transforms the wet steam into superheated steam. The steam output may provide the superheated steam to a user of the espresso machine.

In some embodiments, the system may further includes a steam tank that houses water and another resistive heating element positioned within the steam tank. The helical flow path may be in fluid communication with and downstream from the steam tank. The wet steam may be generated via heat transfer from the heating element to the water housed in the steam tank. Furthermore, the steam tank may provide the wet steam to the helical flow path. In at least one embodiment, the system further includes a proportional valve.

The proportional valve may regulate a flow rate of the superheated steam provided to the user. In some embodiments, the system may include a tube-shaped body. The tube-shaped body may houses the resistive heating element and the helical flow path. Some embodiments may include a coil spring that at least partially forms the helical flow path. At least one embodiments includes a steam handle and one or more magnets. The magnets provide the user tactile feedback when operating the steam handle. Furthermore, an espresso machine may include one or more magnetic switches that magnetically coupled to the steam handle. The one or more magnetic switches may sense a position of the steam handle.

Various embodiments are directed towards a method for employing a machine for a preparation of a beverage. The beverage may be a coffee-based beverage. The methods may include partially vaporizing a fluid housed within a tank included in the machine and providing the partially vaporized fluid to a super-heater assembly included in the machine. The super-heater assembly may be downstream from the tank. The method may further include employing the super-heater assembly to further vaporize the fluid and providing the further vaporized fluid to a potable liquid to heat the potable liquid. The fluid may be completely vaporized in the super-heater assembly to generate superheated steam. The potable liquid may include, but is not otherwise limited to milk.

As discussed throughout, the super-heater assembly may include at least a heating element and a flow path positioned around the heating element. The flow path receives the partially vaporized fluid from the tank. The flow path may expose at least a portion of the partially vaporized fluid to the heating element and a heat transfer from the heating element further vaporizes the partially vaporized fluid. In some embodiments, the super-heater assembly further includes a helical member and a body. The heating element, the helical member, and the body form at least a portion of the flow path.

In some embodiments, the method further includes brewing one or more shots of espresso and providing the heated potable liquid to the one or more shots of espresso. In at least one embodiment, the method includes adjusting a flow rate of the partially vaporized fluid from the tank to the super-heater assembly and adjusting a moisture content of the further vaporized fluid that is provided to the potable liquid by adjusting a temperature of a portion of the super-heater assembly. In various embodiments, the flow rate of the partially vaporized fluid from the tank to the super-heater assembly is adjusted by controlling one or more valves positioned downstream from the tank and upstream from the super-heater assembly.

Various embodiments are directed towards one or more methods for generating superheated steam within an espresso machine. At least one of the methods may include generating wet steam within a steam tank. The steam tank may be included in the espresso machine. The method may further include transmitting the wet steam from the steam tank to a super-heater included in the espresso machine. The super-heater may include a body and a flow path within the body. The body may be separate from the steam tank. In some embodiments, the method includes superheating the wet steam in the flow path by transferring thermal energy generated within the body to the wet steam and providing the superheated steam to a user of the espresso machine.

In some embodiments, the method includes employing the espresso machine to pre-wet coffee grounds at a first flow rate of water provided to the coffee grounds. The method may include employing the espresso machine to brew one or more shots of espresso from the pre-wetted coffee grounds at a second flow rate of water provided to the pre-wetted coffee grounds. The second flow rate may be greater than the first flow rate. In at least one embodiment, the super-heater may include a heating element positioned within the body. A portion of the heating element may form at least a portion of the flow path. When the wet steam flows through the flow path, the wet steam is in direct physical contact with the heating element.

In various embodiments, the method may include adjusting a flow rate of the transmitting of the wet steam from the steam tank to the super-heater. Adjusting the flow rate may include employing a flow rate regulating assembly included in the espresso machine. A control member of the flow rate regulating assembly may include one or more magnets to provide the user tactile feedback when adjusting the flow rate. A control member of the flow rate regulating assembly may include one or more magnetic switches to sense a position of a steam handle.

In some embodiments, the super-heater may include a helical member positioned in the body and a heating element positioned in the body. In at least one embodiment, the body, the helical member, and the heating element are coaxial about a longitudinal axis of the body. In various embodiments, the super-heater includes a first end cap and a second end cap. The first end cap may be positioned on a first longitudinal end of the body. The second end cap may be positioned on a second longitudinal end of the body.

Various embodiments are directed towards one or more methods for preparing a beverage. The beverage may be a coffee-based beverage, such as but not limited to a latte, cappuccino, or the like. In some embodiments, the beverage may be a tea-based, a chai-based beverage, or the like. The method may include brewing a volume of coffee, generating steam, and providing the steam to a super-heater assembly. The volume of coffee may include, but is not otherwise limited to one or more shots of espresso. The generated steam may include wet steam. The method may further include employing the super-heater assembly to heat the steam to a temperature that is greater than a vaporization temperature of water at a pressure of the super-heater assembly. For instance, the wet steam may be turned into superheated steam. The method may further include providing the heated steam to a potable liquid to heat the potable liquid, such as but not limited to milk. Furthermore, the heated potable liquid may be combines with the volume of coffee.

In some embodiments the method may further include regulating a flow rate of the heated steam provided to the user. Regulating the flow rate may include controlling valves positioned between a steam tank and the super-heater assembly. The steam tank may generate the steam. In at least one embodiment, the method also includes employing a thermocouple to control the temperature of the heated steam that is greater than the vaporization temperature of water at the pressure of the super-heater assembly.

BRIEF DESCRIPTION OF THE DRAWINGS

Preferred and alternative examples of the present invention are described in detail below with reference to the following drawings:

FIG. 4A illustrates another embodiment of a steam super-heater assembly that is consistent with the various embodiments.

FIG. 4B shows a longitudinal cross-sectional view of the steam super-heater assembly of FIG. 4A.

FIG. 5A illustrates yet another embodiment of a steam super-heater assembly that is consistent with the various embodiments.

FIG. 5B shows a longitudinal cross-sectional view of the steam super-heater assembly of FIG. 5A.

FIG. 5C shows a longitudinal cross-sectional view of still another embodiment of a steam super-heater assembly that is consistent with the various embodiments.

FIG. 5D shows a lateral cross-sectional view of the steam super-heater assembly of FIG. 5C.

DETAILED DESCRIPTION OF THE INVENTION

Figure 1:
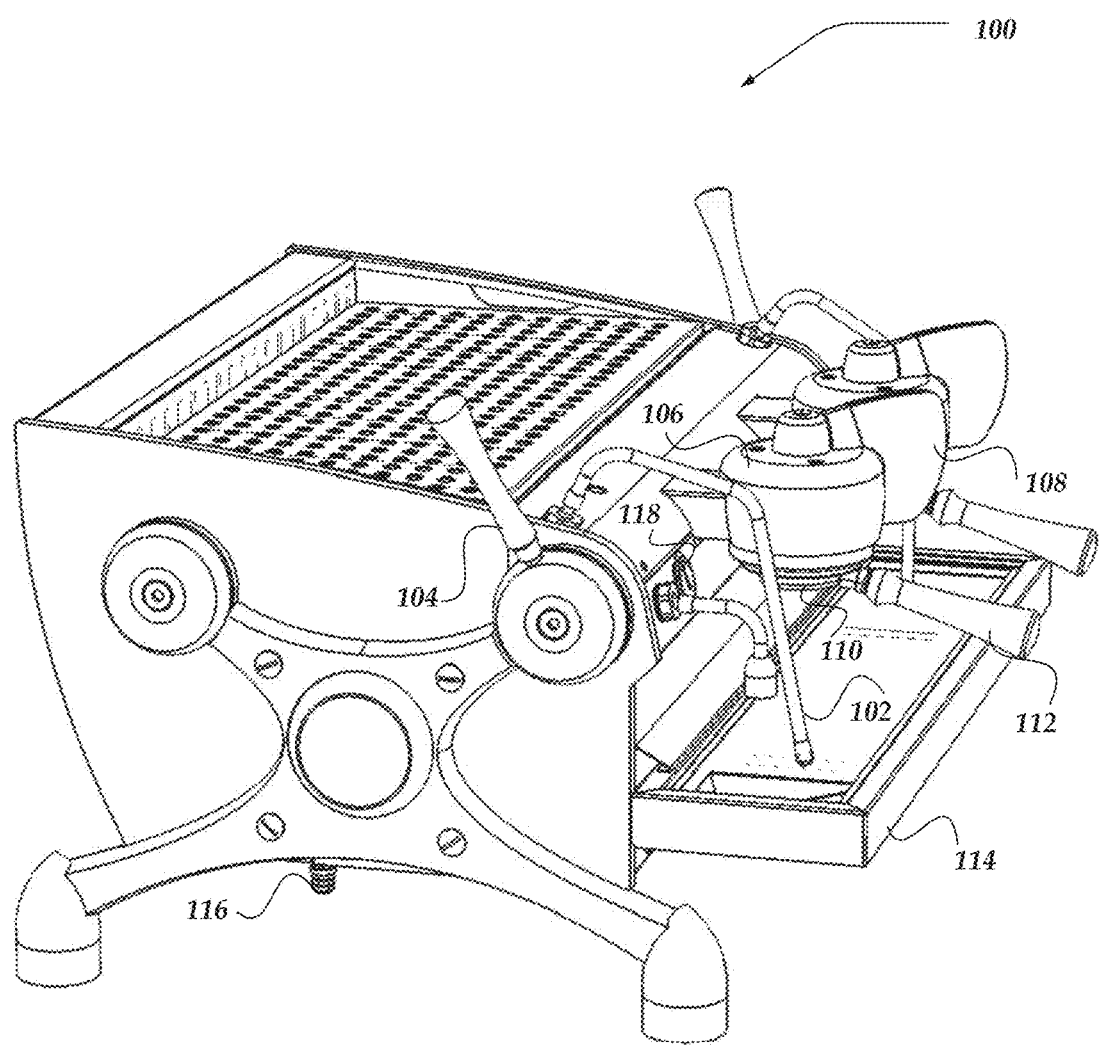
FIG. 1 illustrates a perspective view of one embodiment of a pump-driven espresso machine that generates superheated steam and is consistent with the various embodiments described herein.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "fluid" may refer to a substance that continually deforms or flows under an applied sheer stress. Fluids may include states of matter other than solid states. Accordingly, a fluid may include, but not be limited to a liquid or a gas. Accordingly, a fluid may include a vaporized state of mater. In some embodiments, a fluid may include a liquid state of matter.

As used herein, the term "vapor" may refers to a gaseous state of matter. The term "vaporize" may refer to converting a solid or liquid state of the matter to the vapor or gaseous state of the matter.

As used herein, the term "steam" may refer to a vaporized, or at least partially vaporized state of matter. Thus, steam may refer to a gaseous state of matter. Such vaporized (or partially vaporized) matter may include but is not otherwise limited to water. Whether the matter is vaporized depends upon at least one of the temperature of matter, the pressure of the matter, and the like.

As used herein, the term "wet steam" may refer to partially vaporized matter, such as but not limited to water. Thus, wet steam is steam that includes a combination of vaporized and non-vaporized particles of matter. For instance, wet steam may include vaporized water molecules, as well as non-vaporized water molecules. Wet steam may be characterized by the fractional composition of the non-vaporized/vaporized particles. For instance, 3% wet steam may include 97% vaporized water molecules and 3% liquid-water molecules. Thus, the higher the concentration of liquid-water molecules, the wetter the steam.

Wet steam may exist in a system, where a portion of the water molecules are liquid-water molecules (and another portion are vaporized-water molecules). However, not enough latent heat has been transferred to the water molecules to completely vaporize all of the water molecules included in the system.

As used herein, the terms "dry steam" or "superheated steam" may refer to fully vaporized matter, such as but not limited to water. Thus, dry steam or superheated steam is steam that include little or no non-vaporized particles of matter. For instance, dry steam may include 100%, or close to 100%, vaporized water molecules. Enough latent heat has been transferred to the water molecules to completely vaporize all of the water molecules included in the system.

Thus, superheated steam may store more energy than wet steam. Accordingly, superheated steam may transfer energy (or heat) without condensing. Superheated steam may be cooled somewhat, without condensing.

The energy transfer capacity of dry or superheated steam may be less than the energy transfer capacity of wet steam. For instance, a heat transfer coefficient of superheated steam may be less than the corresponding heat transfer coefficient of the wet steam.

Some processes to prepare various beverages, such as but not limited to coffee-based beverages may employ steam to heat and/or froth a potable liquid to combine with the one or more espresso shots. Such coffee-based beverages may include cappuccinos, lattes, macchiatos, and the like. Such potable liquids that may be heated and/or frothed via superheated steam may include, but are not otherwise limited to dairy-based milk, soy-based milk, rice-based milk, almond-based milk, hemp-based milk, coconut-based milk, cashew-based milk, or the like.

In various embodiments discussed herein, the employed steam may be superheated steam. In at least one embodiment, the employed steam may include dry steam. Employing superheated steam to heat and/or froth the potable liquid may be more advantageous than employing wet steam in the preparation of a beverage, including but not limited to coffee-based beverages, tea-based beverages, chai-based beverages, and the like. In some embodiments, employing superheated steam to heat and/or froth the potable liquid may be more advantageous than employing wet steam in the preparation of beverages.

For instance, when superheated steam is employed to froth milk, the frothed milk is significantly lighter, creamier, and more sweet than milk frothed with wet steam. At least because wet steam includes non-vaporized water, the employment of wet steam waters down and increases the weight (or density) of the steamed and/or frothed milk. Additionally, wet steam condenses more than dry and/or superheated steam when transferring heat energy to the milk. Thus, milk frothed with wet steam is further watered down, as compared to milk frothed with dry and/or superheated steam, which condenses less than wet steam.

Accordingly, the weight or density of milk frothed with superheated steam is lighter than, as compared to milk frothed with wet steam. Additionally, because superheated steam does not water down the frothed milk, milk frothed with superheated steam appears creamier than milk frothed with wet steam. The creamier appearance includes a creamier visual appearance and a creamier tasting experience, as well as a creamier feeling. Furthermore, milk frothed with superheated steam is sweater than milk frothed with wet steam. The superheated steam may release more of sugars within the milk, as compared to wet steam.

Accordingly, in at least some embodiments, a milk with a lower fat content may be frothed with superheat steam, and provide the tasting, visual appearance, and "mouth-feel" of a frothed milk of a higher fat content. For instance, a latte may be prepared skim milk frothed with superheated steam, and for all intents and purposes, the consumer may be provided the experience of drinking a latte prepared with steamed and/or frothed 1% milk. Similarly, a chai-based beverage may be prepared with 2% milk frothed with superheated steam, and for all intents and purposes, the consumer may be provided the experience of drinking a chai-based beverage prepared with steamed and/or frothed whole milk. As yet another example, a cappuccino prepared 1% milk frothed with superheated steam, the consumer may, for all intents and purposes, be provided the experience of drinking a cappuccino prepared with steamed and/or frothed 2% milk.

Various embodiments of assemblies, systems, and espresso machines discussed herein may generate at least superheated steam and/or dry steam to heat and/or froth the potable beverage combined with the brewed espresso to prepare coffee-based drinks. Furthermore, various methods of preparing coffee-based beverages and/or employing espresso machines discussed herein may employ at least superheated steam and/or dry steam.

In addition to the advantages of employing superheated and/or dry steam in the preparation of an espresso-based drink, the flavor profile of the espresso shot may be of critical importance. The flavor profile of an espresso shot is dependent upon many factors associated with the espresso machine, the coffee grounds, and the brewing process used to produce the shot. Such factors include the coarseness of the ground coffee beans, the temperature, pressure, and volume of water forced through the grounds, as well as the time for which the water is in contact with the grounds and the distribution of water over the grounds. Slowly and fully pre-wetting the grounds, prior to forcing the heated pressurized water through the grounds, may greatly increase the quality and complexity of the taste profile of the shot. Coffee beans used to make espresso may contain carbon dioxide and other gasses which may affect the taste profile of the espresso shot. Some of these gasses may be acquired by the beans during a roasting process. Whole coffee beans are roasted prior to grinding the beans and brewing espresso and preparing other coffee drinks with the ground beans. The roasting process, which involves heating the beans, is required to produce some of the characteristic flavors associated with coffee. During the roasting process, carbon dioxide may be formed within the cell structure of the coffee beans.

Slowly and fully pre-wetting the coffee grounds with water, prior to brewing espresso, may allow for the release of the carbon dioxide from the ground coffee beans. When at least a portion of the carbon dioxide is released, or out-gassed, from the ground coffee beans, the barista may grind the beans significantly finer than is otherwise possible. Many individuals experience a greater and more complex taste profile of an espresso shot if the coffee grounds have been fully pre-wetted prior to the full pressure brewing process as there is an increasing of the surface area of the finer ground coffee and more of the coffee oils are then extracted, increasing mouth-feel and decreasing bitterness of the espresso.

Brewing one or more shots of espresso may include a plurality of phases. For instance, brewing a shot of espresso may include at least a pre-brew phase and an extraction phase. The flow rate of water provided to the coffee grounds may be controlled, regulated, and/or varied during each of the phases included in the brewing process. U.S. patent application Ser. No. 14/015,823, filed on Aug. 30, 2013 and entitled SYSTEM, METHOD, AND APPARATUS FOR REGULATING FLOW RATE IN AN ESPRESSO MACHINE, the contents of which are hereby fully incorporated by reference, describes various embodiments of controlling, regulating, and varying the flow rate of water during a multi-phase expresso brewing process. Furthermore, U.S. patent application Ser. No. 14/580,665, filed on Dec. 23, 2014 and entitled SYSTEM, METHOD, AND APPARATUS FOR REGULATING FLOW RATE IN AN ESPRESSO MACHINE, the contents of which are hereby fully incorporated by reference, describes various embodiments of controlling, regulating, and varying the flow rate of water during a multi-phase expresso brewing process.

Espresso Machines

FIG. 1 illustrates a perspective view of one embodiment of a pump-driven espresso machine 100 that generates superheated steam and is consistent with the various embodiments described herein. In at least one embodiment, espresso machine 100 may generate dry steam. Espresso machine 100 of FIG. 1 may include similar features, components, and/or functionality of the various embodiments described herein, including, but not limited to espresso machine 200 of FIG. 2 or espresso machine 600 of FIG. 6.

In FIG. 1, espresso machine 100 is shown having steam wand 102, wherein espresso machine 100 may deliver pressurized steam through at least one steam aperture (not shown) disposed on a distal end of steam wand 102. Steam wand 102 may deliver the generated superheated and/or dry steam through the at least one steam aperture. In some of the various embodiments, at least a portion of the distal end of steam wand 102, including the one or more steam apertures, may be submerged in a volume of a potable liquid, such as but not limited to dairy-based milk, soy-based milk, rice-based milk, almond-based milk or the like. The volume of potable liquid may be housed by a steaming cup (not shown).

Superheated and/or dry steam delivered to the volume of the potable liquid through the one or more steam apertures may steam, froth, and/or heat potable fluid, used to prepare an espresso based beverage, such as a latte or cappuccino. In some of the various embodiments, the position of the steam wand 102 may be rotatably adjustable.

As discussed throughout, a flow rate of superheated and/or dry steam through steam wand 102 and the one or more steam apertures may be controlled by steam handle 104. In some of the various embodiments, the flow rate of steam through the at least one steam aperture may vary between a maximum flow of steam and no steam. In at least one embodiment, the flow rate of steam may depend upon the position of steam handle 104. In at least one embodiment, a user of espresso machine 100, or barista, may be enabled to rotate the position of steam handle 104 to control the flow rate of steam through steam wand 102 and the at least one steam aperture.

In some embodiments, espresso machine 100 includes a steam super-heater assembly (not shown in FIG. 1) to generate the superheated and/or dry steam. Espresso machine 100 may include a steam super-heater assembly at least similar to any of the various embodiments discussed herein, including but not limited to steam super-heater assembly 250, 300, 400, 500, or 650 of FIGS. 2-6 respectively.

In some embodiments, espresso machine 100 may include brew cap assembly 106. In at least one embodiment, the heated pressurized water is delivered to coffee grounds through brew cap assembly 106. Brew cap assembly 106 may include at least one giggleur (not shown). A giggleur may include at least one of an aperture, orifice, or valve from which pressurized water is forced through and expelled out of. A giggleur may be configured and arranged to deliver a volume of water to the coffee grounds in a stream or in a spray, similar to a nozzle assembly.

Portafilter assembly 110 may be rotatably coupable to an underside of brew cap assembly 106. In at least one of the various embodiments, the barista may couple portafilter assembly 110 to the underside of brew cap assembly 106 by at least exerting a rotational force on portafilter handle 112.

In at least one embodiment, portafilter assembly 110 may house a coffee ground basket (not shown). In some embodiments, coffee ground basket may be a basket filter that houses coffee grounds. Accordingly, in at least one embodiment, brew cap assembly 106 may deliver heated pressurized water, through at least the giggleur (not shown), to coffee grounds housed in the coffee ground basket included in portafilter assembly 110 and coupled to brew cap assembly 106. In some embodiments, the coffee ground basket may permit the flow of at least a portion of the water delivered by brew cap assembly 106, but restricts the flow of the coffee grounds.

In some of the various embodiments, heated pressurized water may flow from brew cap 106 into portafilter assembly 110 and, due to at least the pressure, at least a portion of the heated pressurized water may be forced or extracted through the coffee grounds housed within coffee ground basket contained within portafilter assembly 110. Espresso may be extracted through the basket filter and flow out of portafilter assembly 110 through at least one portafilter aperture (not shown) disposed on an underside of portafilter assembly 110. The produced espresso may be deposited in an espresso shot glass (not shown) disposed on drip tray 114.

Some embodiments of espresso machine 100 may include brew pressure gauge 118, which may give an indication, or reading, of the pressure of the heated pressurized water at least one point in at least one brew flow line (not shown) included in espresso machine 100. In some embodiments, brew pressure gauge 118 may indicate the pressure within portafilter assembly 110 and between the giggleur and the coffee grounds. In at least one embodiment, brew pressure gauge 118 may be an analog gauge. In some embodiments, brew pressure gauge 118 may be a digital gauge. Espresso machine 100 may include water supply 116, which supplies water to espresso machine 100. The water from water supply 116 may be heated and pressurized by espresso machine 100 and used to produce espresso and/or steam. In some embodiments, water supply 116 may include a water filter.

In at least one of the various embodiments, espresso machine 100 may include brew handle 108. Brew handle 108 may be employed to control an espresso brewing process. In at least one of the various embodiments, the espresso brewing process may include at least two phases: a pre-brew phase and an extraction phase. The two phases may be distinct and/or independent phases. The two phases may be temporally-ordered phases, with the pre-brew phase occurring prior to the extraction phase.

In at least one embodiment, brew handle 108 may be used to initiate the espresso brewing process. In some of the various embodiments, brew handle 108 may be used to initiate the pre-brew phase of the brewing process. In some of the various embodiments, brew handle 108 may be used to transition the espresso brewing process from the pre-brew phase to the extraction phase. In at least one of the various embodiments, brew handle 108 may be used to terminate the espresso brewing process, including at least terminating the extraction phase.

Espresso machine 100 may include a processor or processor device (not shown). In some embodiments, the processor device may at least control at least a portion of the espresso brewing process. In some embodiments, the processor device may adjust or control the flow rate during the espresso brewing process. In at least one embodiment, the processor device may control or adjust at least one valve, such as but not limited to a proportional valve, included in espresso machine 100. The valve may be employed to regulate the flow rate of the superheated steam through steam want 102.

In some embodiments, espresso machine 100 may include one or more flow meters (not shown). The one or more flow meters may enable a measurement of the flow rate of water through one or more brew groups. The one or more flow meters may enable a measurement of a volume of water flowing during at least a portion of the espresso brewing process.

Figure 2:
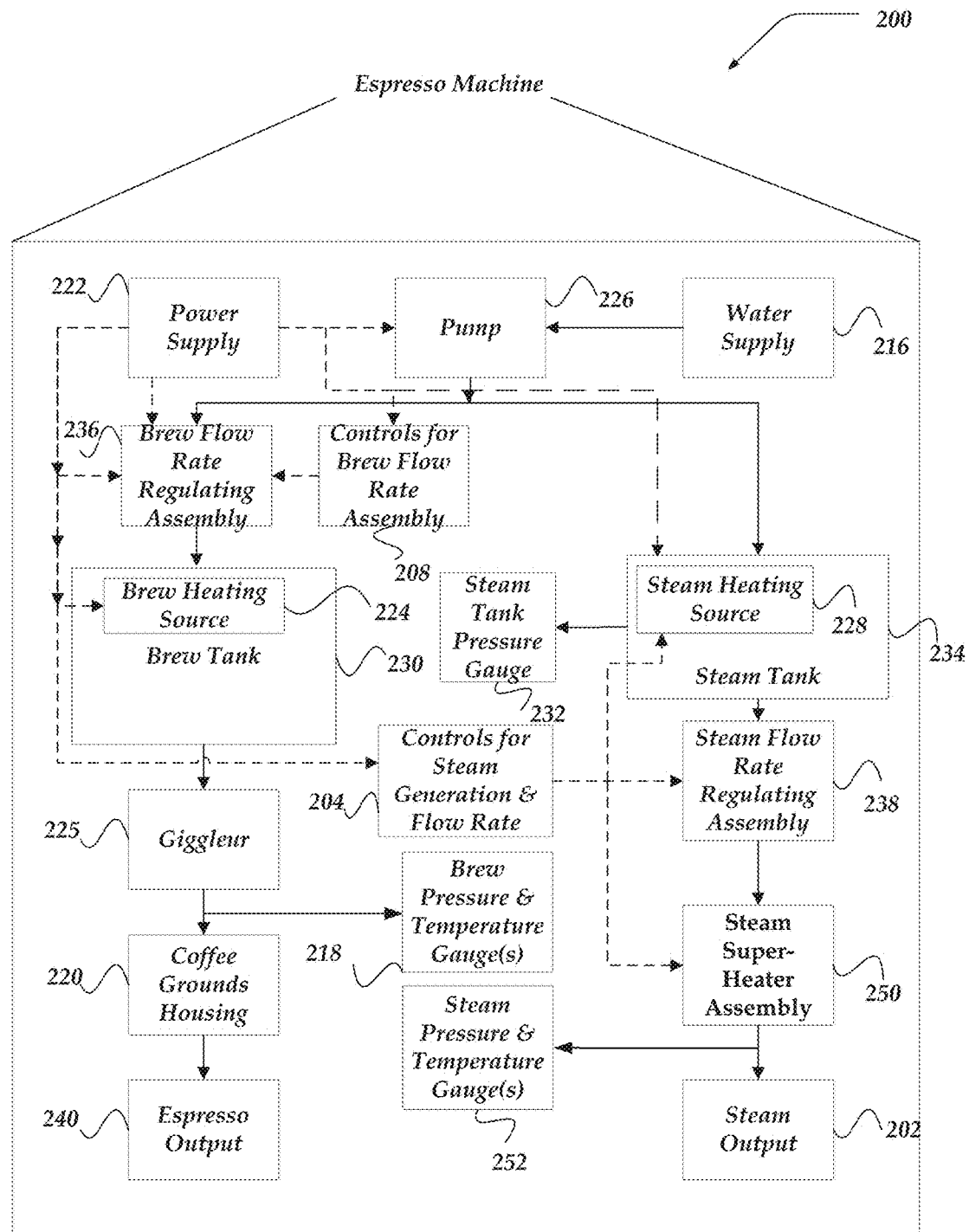
FIG. 2 illustrates a schematic view of one embodiment of pump-driven espresso machine that includes a steam super-heater assembly that may enable the generation of superheated steam and is consistent with the various embodiments.

FIG. 2 illustrates a schematic view of one embodiment of pump-driven espresso machine 200 that includes a steam super-heater assembly 250 that may enable the generation of superheated steam and is consistent with the various embodiments.

In various embodiments, espresso machine 200 may include power supply 222. As shown by the hashed connections, power supply 222 may provide at least a portion of the electrical power required to operate various components and/or assemblies of espresso machine 200, such as brew heating source 224, steam heating source 228, controls for brew flow rate assembly 208, and pump 226. In some embodiments, power supply 222 may provide at least electrical power to at least one of brew flow rate regulating assembly 236, steam flow rate regulating assembly 238, and controls for steam generation and flow rate regulating assembly 204. In the context of FIG. 2, hashed connecting lines are used to illustrate at least electrical coupling and/or electrical communication of the components. The electrical coupling may include the ability to distribute electrical power and/or electrical signals that may enable the controlling or operation of the various components. Also in the context of FIG. 2, directional solid connecting lines are used to illustrate at least the fluid and/or pressure communication of the components.

In some embodiments, espresso machine 200 may include water supply 216. Water supply 216 may supply water to pump 226. In some embodiments, pump 226 may pump at least a portion of the water supplied by water supply 216 to brew tank 230, wherein the pumped water may be heated, pressurized, and used in the brewing of espresso. In some embodiments, pump 226 may pump water to steam tank 234, where the pumped water may be used to generate superheated steam employed in the preparation of some coffee based drinks. In some embodiments, water supply 216 may include at least a water filter. In at least one of the various embodiments, brew tank 230 and steam tank 234 may be supplied water from separate and/or independent water supplies and/or separate pumps. In at least one embodiment, brew tank 230 and steam tank 234 may be supplied water from the same water supply and/or the same pump.

In some embodiments, pump 226 may provide at least a portion of the pressure required to pressurize water stored in brew tank 230. In some embodiments, a plurality of pumps may be included in espresso machine 200. In at least one embodiment, at least one pump may be dedicated to pressurizing water stored in brew tank 230. Similarly, pump 226 may provide at least a portion of the pressure required to pressurize water stored in steam tank 234. In at least one embodiment, at least one pump may be dedicated to pressurizing water stored in steam tank 234.

In at least one embodiment, espresso machine 200 may include brew heating source 224. Brew heating source 224 may provide at least a portion of the heat energy required to heat water supplied by water supply 216. At least a portion of the water heated by brew heating source 224 may be stored within brew tank 230. In at least one embodiment, brew heating source 224 may be disposed in brew tank 230. In some of the various embodiments, brew heating source 224 may include a resistive element, such as a resistive coil or other type of heating element.

Some embodiments of espresso machine 200 may include steam heating source 228. Steam heating source 228 may provide at least a portion of the heat energy required to produce steam within steam tank 234. In at least one embodiment, steam heating source 228 may be disposed within steam tank 234. In some of the various embodiments, steam heating source 228 may include a resistive element, such as a resistive coil or other type of heating element.

In various embodiments, wet steam may be generated within steam tank 234 via the transfer of heat energy from steam heating source 228 to the pressurized water within steam tank 234. The generation of wet steam within steam tank 234 may increase the pressure within steam tank 234.

Generating wet steam within steam tank 234 may include the partial vaporization of the water molecules stored within steam tank 234.

The wet steam generated in steam tank 234 may flow into steam super-heater assembly 250. Steam super-heater assembly 250 employs the provided wet steam to generate superheated steam. In at least one embodiment, at least a portion of the steam generated from the wet steam in the steam super-heater assembly 250 may be dry steam. Various embodiments of steam super-heater assemblies are discussed throughout. For instance, various embodiments of steam super-heater assemblies are discussed throughout, such as but not limited to in conjunction with FIGS. 3-5B. However, briefly, steam super-heater assembly 250 may transfer heat to the wet steam to complete the vaporization of the wet steam generated in steam tank 234 to generate dry steam. Furthermore, steam super-heater assembly 250 may transfer additional heat to the dry steam to increase the temperature beyond liquid/vapor boundary at the pressure within steam super-heater assembly 250 to generate superheated steam.

Thus, steam super-heater assembly is provided wet steam via a steam input of steam super-heater assembly 250 and provides or outputs superheated steam via a steam output of steam super-heater assembly 250. At least a portion of the outputted steam via the steam output of the steam super-heater assembly 250 may be dry steam.

The superheated and/or dry steam generated via the steam super-heater assembly 250 flows out of espresso machine 200 via the steam output 202. For instance, steam output 202 may be included in steam wand 102 of espresso machine 100 of FIG. 1. Steam output 202 may include one or more steam apertures in steam wand 102. The superheated and/or dry steam outputted via steam output 202 may be employed to heat, steam, and/or froth a potable liquid for the preparation of one or more beverages, including but not limited to coffee-based beverages, tea-based beverages, chai-based beverages, and the like.

The flow rate at which the wet steam flows into the steam super-heater assembly 250 may be regulated via the steam flow rate regulating assembly 238. Note that the steam flow rate regulating assembly also regulates the flow rate of the superheated and/or dry steam of espresso machine 200 via steam output 202. The steam flow rate regulating assembly 238 may include a valve, such as but not limited to a proportional valve. The steam flow rate regulating assembly 238 may be controlled via the controls for steam generation and flow rate 204. For instance, controls for steam generation and flow rate 204 may include but are not otherwise limited to steam handle 104 of espresso machine 100 of FIG. 1. Likewise, the controls for steam generation and flow rate 204 may control the temperature of the generated superheated steam.

In at least one embodiment, controls for steam generation and flow rate 204 may include one or more controllers. In some embodiments, the controller may be a processor device, such as a microcontroller, a microprocessor, a central processing unit (CPU), or the like. A controller may include a logic device, such as but not limited to an application specific integrated circuit (ASIC), field programmable gate array (FPGA), or the like. In various embodiments, controls for steam generation and flow rate 204 may include one or more thermocouples.

Steam flow rate regulating assembly 238 may regulate the flow rate of the wet steam from steam tank 234. Thus, as shown in FIG. 2, steam flow rate regulating assembly 238 may be downstream from the steam tank 234. Steam super-heater assembly 250 may be downstream from steam tank 234. In addition, as shown in FIG. 2, steam flow rate regulating assembly 238 may be upstream from the steam super-heater assembly 250. Accordingly, steam flow rate regulating assembly 238 may be positioned or located intermediate the steam tank 234 and steam super-heater assembly 250. In at least one embodiment, steam flow rate regulating assembly 238 may be positioned or located downstream from steam super-heater assembly 250.

In at least one embodiment, espresso machine 200 may include one or more steam pressure and temperature gauges 252. Steam pressure and temperature gauges 252 may give an indication of the pressure of at least one point between steam tank 234 and steam output 202. In at least one embodiment, steam pressure and temperature gauges 252 may give an indication of the temperature of superheated steam output by steam output 202.

In at least some embodiments, brew tank 230 may store heated and pressurized water. During at least a portion of an espresso brewing process, at least a portion of the heated pressurized water stored within brew tank 230 may flow downstream from brew tank 230 to coffee grounds housed in coffee ground housing 220 and then to espresso output 240. In at least one embodiment, at least a portion of the heated pressurized water may flow through a downstream giggleur 225 before reaching coffee grounds housing 220. In some embodiments, giggleur 225 may include at least an aperture or an orifice. In some embodiments, giggleur 225 may include a nozzle and/or valve. In some embodiments, a diameter of the aperture or orifice included in giggleur 225 may be with a range, such as 0.5 mm to 1.0 mm. In at least some embodiments, the diameter of the aperture or orifice may be approximately 0.7 mm. In at least one embodiment, giggleur 225 may be characterized by at least a feature size of the included aperture or orifice.

In at least one of the various embodiments, coffee ground housing 220 may be included in a portafilter assembly, such as portafilter assembly 110 of FIG. 1. In at least some embodiments, steam tank 234 may store pressurized steam. In some embodiments, at least a portion of the steam stored within steam tank 234 may flow from steam tank 234 to steam output 202.

In at least one embodiment, espresso machine 200 may include one or more brew pressure and temperature gauges 218. Brew pressure and temperature gauges 218 may give an indication of the pressure of at least one point between pump 226 and coffee ground housing 220. In at least one embodiment, brew pressure gauge may give an indication of pressure downstream of giggleur 225 and upstream of coffee grounds. Brew pressure and temperature gauges 218 may give an indication of the temperature of at least one point between pump 226 and coffee ground housing 220.

In at least one embodiment, espresso machine 200 may include steam tank pressure gauge 232. Steam pressure gauge 232 may give an indication of the pressure at at least one point between pump 226 and steam output 202. In at least one embodiment, steam pressure gauge 232 may be an analog gauge. In some embodiments, steam pressure gauge 232 may be a digital gauge.

In at least one embodiment, espresso machine 200 may include brew flow rate regulating assembly 236. In some embodiments, brew flow rate regulating assembly 236 may be upstream of brew tank 236. During at least a portion of the espresso brewing process, water may flow from pump 226 and through brew flow rate regulating assembly 236 before reaching brew tank 230. In at least one alternative embodiment, brew flow rate regulating assembly 236 may be downstream of brew tank 235, but upstream of giggleur 225.

In at least one of the various embodiments, brew flow rate regulating assembly 236 may regulate, or limit, the flow rate of heated pressurized water arriving at coffee ground housing 220, during at least a portion of the espresso brewing process. In at least one of the various embodiments, giggleur 225 may regulate, or limit, the flow rate of heated pressurized water arriving at coffee ground housing 220, during at least a portion of the espresso brewing process.

At coffee ground housing 220, the flow rate regulated water may be exposed to coffee grounds housed within. In some embodiments, at least a portion of the flow regulated water delivered to coffee grounds may pre-wet the coffee grounds. At least a portion of the flow regulated water delivered to coffee grounds, may be extracted through the pre-wetted coffee grounds to produce espresso. In some embodiments, at least a portion of the extracted espresso may exit espresso machine 200 through espresso output 240. In at least one embodiment, espresso output 240 may include at least a portafilter aperture, such as the portafilter aperture discussed in the context of FIG. 1. The produced espresso may flow from espresso machine 100 via the portafilter aperture.

In at least one embodiment, brew flow rate regulating assembly 236 may adjustably regulate the flow rate of heated pressurized water flowing to coffee ground housing 220. Various embodiments of brew flow rate regulating assembly 236 are described in greater detail with regard to FIGS. 3-6. However, briefly stated, in at least one embodiment, brew flow rate regulating assembly 236 may include at least one flow path, wherein a flow rate of water, which flows into and out of brew flow rate regulating assembly 236, may be regulated, adjusted, or otherwise controlled. In at least one embodiment, regulating, adjusting, or otherwise controlling the flow rate of water into and out of brew flow rate regulating assembly 236 may regulate, adjust, or otherwise control the brew flow rate of water delivered to the coffee grounds during an espresso brewing process. In at least one embodiment, regulating, adjusting, or otherwise controlling the flow rate of water into and out of brew flow rate regulating assembly 236 may regulate, adjust, or otherwise control the pressure of the water delivered to the coffee grounds during an espresso brewing process.

In some embodiments, brew flow rate regulating assembly 236 may include a plurality of flow paths, where a flow rate of pressurized water, for each individual flow path in the plurality of flow paths, may be regulated, adjusted, or otherwise controlled. In some embodiments, the plurality of flow paths may include independent flow paths. In at least one of the various embodiments, at least a portion of the plurality of flow paths may include parallel flow paths. In some embodiments, the independent flow paths may vary in both transverse and longitudinal size and/or shape. In some embodiments, the independent flow paths may vary in transverse diameter or transverse cross-sectional area. In at least one embodiment, a flow rate through brew flow rate regulating assembly 236 may include the sum of at least a portion of the individual flow rates of each of the plurality of flow paths.

Steam Super-Heater Assemblies

Figure 3:
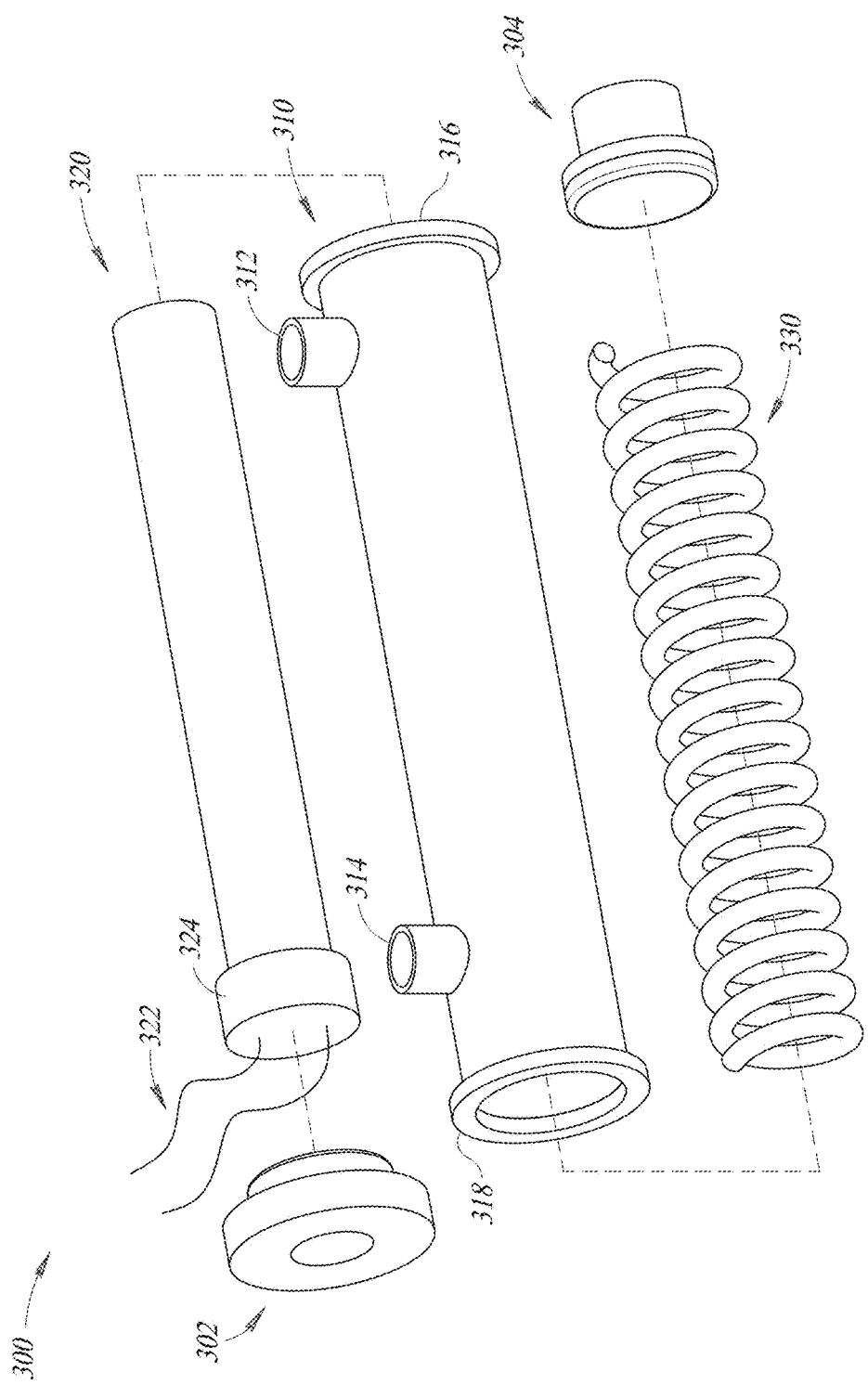
FIG. 3 illustrates an exploded view of a steam super-heater assembly that is consistent with the various embodiments.

FIG. 3 illustrates an exploded view of a steam super-heater assembly 300 that is consistent with the various embodiments. Steam super-heater assembly 300 may be employed in any of the various embodiments discussed herein to generate superheated and/or dry steam. For instance, various embodiments of steam super-heater assembly 300 may be included in any of the espresso machines discussed herein, including but not limited to espresso machine 100 of FIG. 1, espresso machine 200 of FIG. 2, or espresso machine 600 of FIG. 6. Steam super-heater assembly 300 may be employed in any of the various process embodiments discussed herein to generate superheated and/or dry steam, including but not limited to process 700 of FIG. 7A or process 750 of FIG. 7B.

Steam super-heater assembly 300 may include a super-heater body 310, a heating element 320, and one or more helical members 330. Super-heater body 310 may be a substantially tube-shaped body. In some embodiments, super-heater body 310 may be substantially a cylindrical shell that includes a longitudinal axis. The tube-shaped body or cylindrical shell defines an internal cavity of the super-heater body 310. Super-heater body may include a first flange 316 on the first longitudinal end of the tube or cylindrical shell and a second flange 318 on the second longitudinal end of the tube or cylindrical shell. As shown in FIG. 3, the first and second longitudinal ends of super-heater body 310 may be open ended to receive at least the heating element 320 and the helical member 330. The super-heats body 310 may include a longitudinal axis extending between the first and second longitudinal ends of the super-heater body 310.

A longitudinal length of the super-heater body 310 may be substantially equivalent to the distance between the first and second longitudinal ends of the super-heated body 310. The longitudinal length of the super-heater body 310 may be approximately 4 inches. Other embodiments are not so constrained, and the longitudinal length may be any length based on factors such as but not limited to desired flow rate, pressure, temperature, and the like of the generated superheated steam. The diameter of the super-heater body 310 may be approximately 0.75 inches. However, other embodiments are not so constrained, and the diameter may be any diameter based on factors such as but not limited to desired flow rate, pressure, temperature, and the like of the generated superheated steam. In various embodiments, the thickness of the cylindrical shell or tube of super-heater body 310 may be approximately between 0.1 and 0.2 inches. However, other embodiments are not so constrained, and the thickness may be any thickness less than half the diameter of the super-heater body 310 based on factors such as but not limited to desired flow rate, pressure, temperature, and the like of the generated superheated steam.

Super-heater body 310 may be fabricated from any material, including but not limited to a metal. In at least one embodiment, the material may be chosen to decrease heat transfer out of the steam super-heater assembly 300. The choice of the material may be based on factors such as but not limited to desired flow rate, pressure, temperature, and the like of the generated superheated steam. The shape of the lateral cross section of the super-heater body 310 (and internal cavity) is circular in some embodiments, Other embodiments are not so constrained, and the cross sectional shape of each of the super-heater body 310 and the corresponding internal cavity may take on any shape, including but not limited to elliptical, rectangular, square, triangular, and the like.

Super-heater body 310 includes a steam input 312 or input port and a steam output 314 or output port. In some embodiments, the steam input 312 and the steam output 314 may be positioned on the lateral surface of the super-heater body 310, such that each of the steam input/output 312/314 is substantially orthogonal to each of the first and second longitudinal ends of the super-heater body 310. In some embodiments, the steam input 312 is closer to the first longitudinal end of the super-heater body 310 than to the second longitudinal end of the super-heater body 310. In at least one embodiment, the steam input 312 is substantially adjacent the first longitudinal end of the super-heater body 310. In some embodiments, the steam output 314 is closer to the second longitudinal end of the super-heater body 310 than to the first longitudinal end of the super-heater body 310. In at least one embodiment, the steam output 314 is substantially adjacent the second longitudinal end of the super-heater body 310. As shown in FIG. 3, in some embodiments, the steam input 312 and steam output 314 are substantially aligned on the lateral surface of the super-heater body 310.

The heating element 320 may be a substantially rod-shaped heating element. As shown in FIG. 3, the shape of the heating element 320 may substantially match the shape of the super-heater body 310. Accordingly, the lateral cross section of the heating element may take on substantially any shape, including but not limited to circular, elliptical, square, rectangular, triangular, and the like. Because the heating element 320 is positioned or located within the internal cavity of the super-heater body 310, the longitudinal length of the heating element 320 may be close to, but slightly less than the longitudinal length of the super-heater body 310. Similarly, the lateral cross sectional area of the heating element 320 may be less than the lateral cross sectional area of the internal cavity of the super-heater body 310.

The heating element 324 includes a base 324 that may house electronics. At least the rod-shaped portion of heating element 320 may generate thermal energy. In various embodiments, the rod-shaped portion of heating element 320 may include a resistive heater that generates heat via electrical resistance. Heating element 320 may include one or more cables 322 to carry electrical signals to the heating element 320. For instance, the one or more cables 322 may provide electrical power to the heating element. Although not shown in FIG. 3, in various embodiments, a steam super-heater assembly, such as but not limited to steam super-heater assembly 300 may include one or more thermocouples employed to determine the temperature of either the heating element 320, steam within the super-heater assembly 300, or within the internal cavity of super-heater body 310. The one or more cables 322 may provide power to and/or carry away signals from the one or more thermocouples.

The helical member 330 may include a plurality of helical coils or windings. In various embodiments, helical member 330 may be a coil spring. However, other embodiments are not so constrained, and the helical member 330 is not substantially elastically deformable. The longitudinal length, as well as the number, pitch, and radius of the coils in the various embodiments may be varied based on factors, such as but not limited to desired flow rate, pressure, temperature, and the like of the generated superheated steam.

As shown in the exploded view of FIG. 3, the heating element 320 and the helical member 330 are positioned or located within the internal cavity of super-heater body 310. In various embodiments, the super-heater body 310, helical member 330, and the rod-shaped heating element 320 are concentrically configured. In at least one embodiment, the coils of helical member 330 are radially intermediate the lateral internal surfaces of the super-heater body 310 and the lateral surfaces of the heating element 320.

Steam super-heater assembly 300 may include a first end cap 302 and a second end cap 304. The first end cap 302 may mate with and couple to the first longitudinal end of the super-heater body 310. In some embodiments, the first end cap 302 may mate with and/or couple to the first flange 316 of super-heater body 310. Likewise, the second end cap 304 may mate with and couple to the second longitudinal end of the super-heater body 310. In some embodiments, the second end cap 304 may mate with and/or couple to the second flange 318 of super-heater body 310.

In various embodiments, when the first and second end caps 302/304 are coupled to the corresponding first/second longitudinal ends of the super-heater body 310, the steam super-heater assembly 300 is essentially a closed vessel except for the steam input 312 and the steam output 314. As shown in FIG. 3, in some embodiments, the steam input 312 and steam output 314 may include extensions that are substantially orthogonal to the lateral surfaces of the super-heater body 310.

In various embodiments, wet steam enters the internal cavity of the super-heater body 310 via steam input 312. As discussed throughout, within the internal cavity of the super-heater body 310, the heating element 320 fully vaporizes and/or heats the wet steam to generate superheated and/or dry steam within the internal cavity of the super-heater body 310. The generated superheated and/or dry steam exits the super-heater body 310 via steam output 314.

Figure 4C:
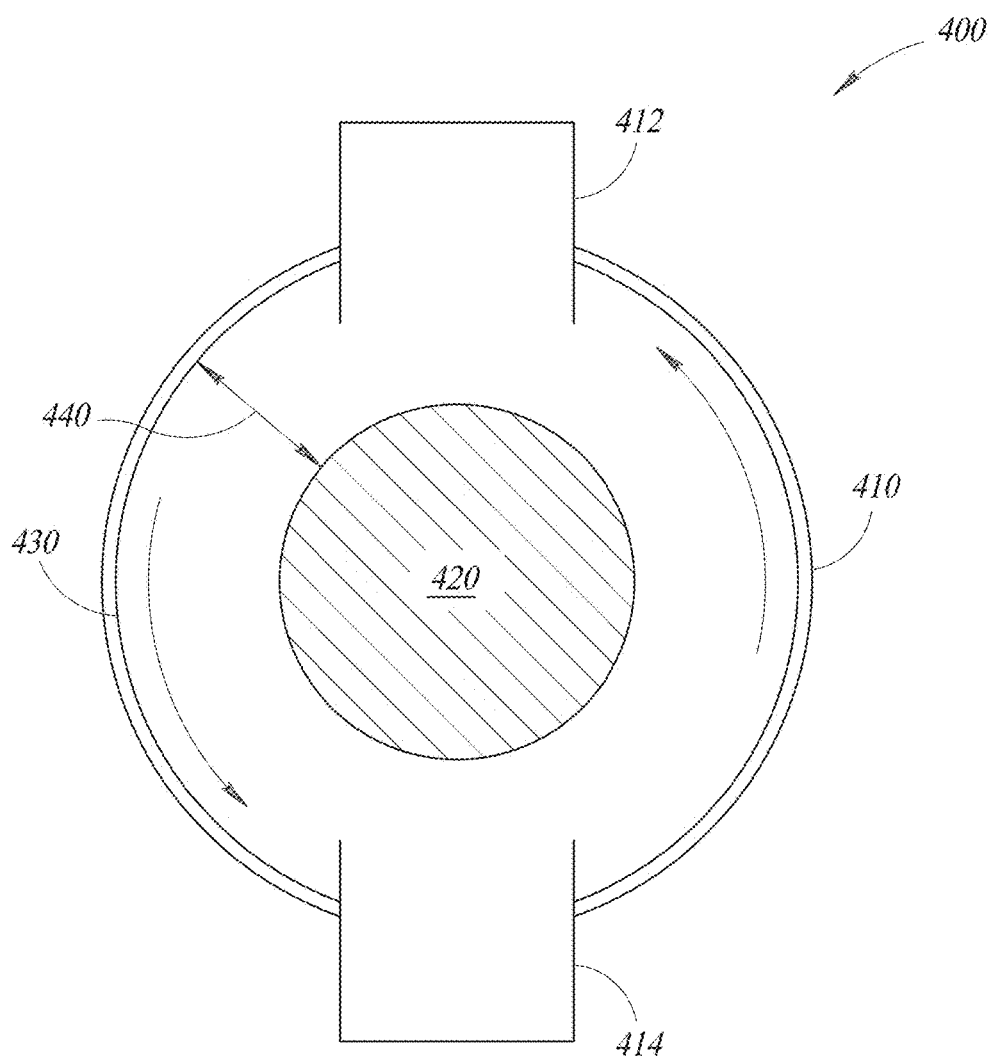
FIG. 4C shows a lateral cross-sectional view of the steam super-heater assembly of FIG. 4A.

FIG. 4A illustrates another embodiment of a steam super-heater assembly 400 that is consistent with the various embodiments. Figure B shows a longitudinal cross-sectional view of the steam super-heater assembly 400 of FIG. 4A. FIG. 4C shows a lateral cross-sectional view of the steam super-heater assembly 400 of FIG. 4A. Steam super-heater assembly 400 may include similar features, components, or functionality of any of the various embodiments discussed herein, including at least but not limited to steam super-heater assembly 250 of FIG. 2 or steam super-heater assembly 300 of FIG. 3. Steam super-heater assembly 400 may be included in any of the embodiments of espresso machines discussed herein, including but not limited to espresso machine 100 of FIG. 1, espresso machine 200 of FIG. 2, or espresso machine of FIG. 6. Steam super-heater assembly 400 may be employed in any of the various process embodiments discussed herein to generate superheated and/or dry steam, including but not limited to process 700 of FIG. 7A or process 750 of FIG. 7B.

Similar to steam super-heater assembly 300 of FIG. 3, steam super-heater assembly 400 of FIGS. 4A-4C includes a super-heater body 410, a heating element 420, and a helical member 430. The view shown in FIG. 4A is at least a partially transparent view, wherein the super-heater body 410 is partially transparent and the heating element 420 and the helical member 420 are shown within the internal cavity of the super-heater body 410.

Similar to super-heater body 310 of FIG. 3, super-heater body 410 includes a first flange 416, second flange 418, steam input 412, and steam output 414. Steam input 412 and steam output 414 include extensions that are substantially orthogonal to the lateral surfaces of the super-heater body 410. In contrast to steam input/output 312/314 of FIG. 3, the extensions of steam input/output 412/414 of steam super-heater assembly 400 are substantially anti-aligned on the lateral surface of the super-heater body 310. Accordingly, the extensions of steam input/output 412/414 are directed in substantially opposite and/or anti-aligned directions that are each substantially orthogonal to the longitudinal axis of steam super-heater assembly 400.

Steam super-heater assembly 400 includes first end cap 402 and second end cap 404 to mate with first and second flanges 416 and 418 respectively. Heating element 420 includes a base 424 and one or more cables 422 that can transmit electrical power, as one as one or more electrical signals enabled to encode at least one or analog and/or digital information.

The longitudinal cross-sectional view of FIG. 4B shows that the coils of helical member 430 are coiled around the rod-shaped portion of heating member 420. The coils are coiled around the heating element and extend in the longitudinal direction of the steam super-heater assembly 400. The super-heater body 410, helical member 430 and the heating element 420 are arranged in a concentric configuration and share the longitudinal axis of steam super-heater assembly 400 as a common axis.

Note that at least FIG. 4B shows wet steam entering the cavity of super-heater body 410 via steam input 412 and superheated steam exiting steam super-heater assembly 400 via steam output 414. FIG. 4B shows that the concentric configuration the super-heater body 410, the helical member 430, and the heating element form a helical flow path between steam input 412 and steam output 414. The general direction of steam flow from the steam input 412 to the steam output 414 is generally along the longitudinal direction. However, wet steam entering steam input 412 travels generally through the helical coil path.

Wet steam entering the internal cavity of super-heater body 410 is exposed directly to the surface of the heating element 420. Thus, the efficiency of heat transfer from heating element 410 to the wet steam is significantly increased. Furthermore, as the wet steam flows from the steam input 412 and flows toward the steam output 414, the wet steam flows substantially along the helical flow path formed by the concentric configuration of the heating element 420, the coils of the helical member 430, and the internal surfaces of the super-heater body 410. Due to the helical nature of the steam flow path between steam input 412 and steam output 414, the length of the flow path is significantly greater than the longitudinal distance between steam input 412 and steam output 414. Accordingly, the total amount of thermal energy transferred from the heating element 420 to the wet steam is significantly increased due to at least the steam's directed exposure to the heating element 420 and the significantly increased length of the steam flow path. Thus, the vaporization of the wet steam is completed during the steam's flow through the internal cavity of the super-heater body 410 and the steam is converted into dry steam. Furthermore, the dry steam is may be further heated and thus superheated steam is generated. The superheated steam exits the steam output 414.

The flow arrows of the lateral cross-sectional view of FIG. 4C show that as the steam flows between the steam input 412 and the steam output 414, the steam is exposed directly to the heated surfaces of heat element 420 and follows a helical path defined by the concentric configuration of the heating element 420, the helical member 430, and the internal surfaces of the super-heater body 410.

FIG. 5A illustrates yet another embodiment of a steam super-heater assembly 500 that is consistent with the various embodiments. FIG. 5B shows a longitudinal cross-sectional view of the steam super-heater assembly 500 of FIG. 5A. Steam super-heater assembly 500 may include similar features, components, or functionality of any of the various embodiments discussed herein, including at least but not limited to steam super-heater assembly 250 of FIG. 2, steam super-heater assembly 300 of FIG. 3, and steam super-heater assembly 400 of FIG. 4. Steam super-heater assembly 500 may be included in any of the embodiments of espresso machines discussed herein, including but not limited to espresso machine 100 of FIG. 1, espresso machine 200 of FIG. 2, or espresso machine 600 of FIG. 6. Steam super-heater assembly 500 may be employed in any of the various process embodiments discussed herein to generate superheated and/or dry steam, including but not limited to process 700 of FIG. 7A or process 750 of FIG. 7B.

Similar to steam super-heater assembly 400 of FIG. 4, steam super-heater assembly 500 of FIGS. 5A-5B includes a super-heater body 510, a heating element 520, and a helical member 530. The view shown in FIG. 5A is at least a partially transparent view, wherein the super-heat body 510 is partially transparent and the heating element 520 and the helical member 520 is shown within the internal cavity of the super-heater body 510.

Similar to super-heater body 310 of FIG. 3, super-heater body 510 includes a first flange 516, second flange 518, steam input 512, and steam output 514. In contrast to steam input/output 312/314 of FIG. 3, steam input 512 and steam output 514 does not include extensions that are substantially orthogonal to the lateral surfaces of the super-heater body 510. Rather, steam input/output 512/514 includes apertures or openings within super-heater body 510.

Steam super-heater assembly 500 includes first end cap 502 and second end cap 504 to mate with first and second flanges 516 and 518 respectively. Heating element 520 includes a base 524 and one or more cables 522 that can transmit electrical power, as one as one or more electrical signals enabled to encode at least one or analog and/or digital information.

FIG. 5C shows a longitudinal cross-sectional view of still another embodiment of a steam super-heater assembly 540 that is consistent with the various embodiments. FIG. 5D shows a lateral cross-sectional view of the steam super-heater assembly of FIG. 5C. Steam super-heater assembly 540 may be a pass through super-heater assembly. Steam super-heater assembly 540 may include two concentric bodies or tubes: inner tube 556 and outer tube 550. At least one of the inner tube 556 or outer tune 550 may be a stainless steel tube. The outer cavity or space between inner tube 556 and outer tube 550 includes a heating element 558. The wet steam is provided via steam input 552 and flows through inner internal cavity 544 (as shown by the flow arrow in FIG. 5C). The wet steam is exposed to the heating element 558 and is transformed into superheated steam, before flowing out of steam output 554. Thus, inner internal cavity 544 may form a flow path for the steam.

Steam super-heater assembly 540 may include one or more cables 542 that may provide electrical power to the heating element 558. Although not shown in FIG. 5C or 5D, in various embodiments, a steam super-heater assembly, such as but not limited to steam super-heater assembly 540 may include one or more thermocouples employed to determine the temperature of either the heating element 558, steam within the super-heater assembly 540, or within the inner internal cavity 544 of super-heater assembly 5400. The one or more cables 542 may provide power to and/or carry away signals from the one or more thermocouples.

Figure 5E:
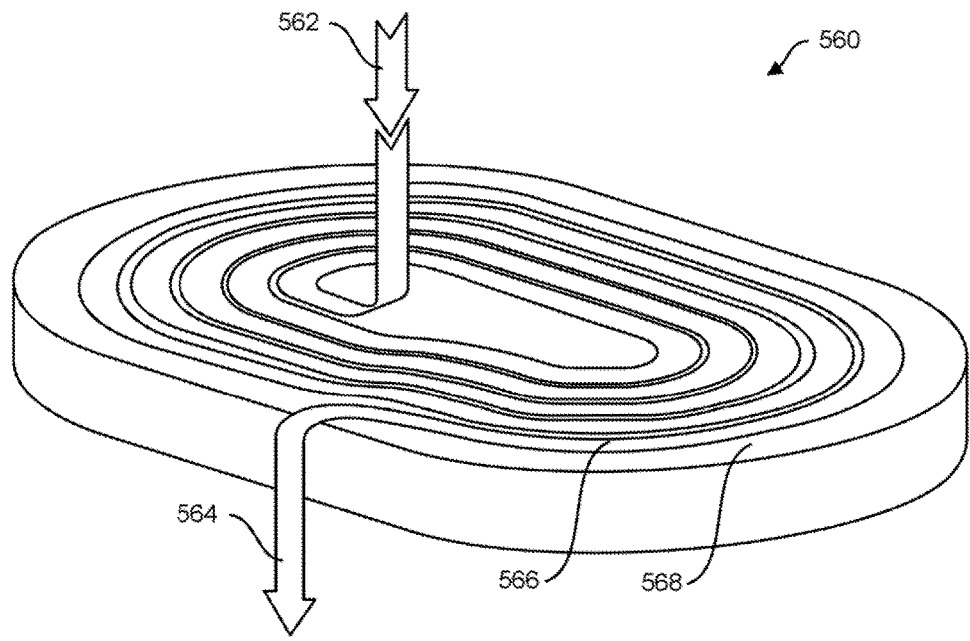
FIG. 5E shows yet another embodiment of a steam super-heater assembly that is consistent with the various embodiments.
Figure 5F:
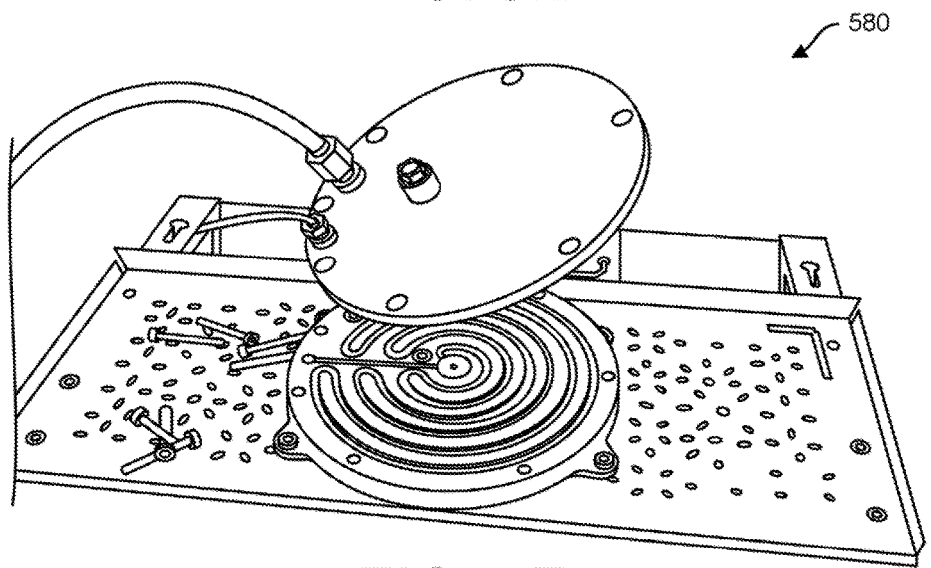
FIG. 5F shows another embodiment of a steam super-heater assembly that is consistent with the various embodiments.

FIG. 5E shows yet another embodiment of a steam super-heater assembly 560 that is consistent with the various embodiments. Steam super-heater assembly 560 includes a steam input 562 (for receiving wet steam) and a steam output 564 for providing superheated steam. Steam super-heater assembly 560 includes a spiraling, helical, or otherwise circuitous steam flow path 556 to expose the wet steam to heating element 568. Heating element 568 transforms the wet steam into superheated steam within steam flow path 556. Due to the spiraling nature of flow path, 556, the steam is directly exposed to heating element 568 for a longer amount of time, and an efficient super-heating process is achieved. FIG. 5F shows another embodiment of a steam super-heater assembly 580 that is consistent with the various embodiments. Steam super-heater assembly 580 may include similar features, components, and/or functionality as to super-heater assembly 560 of FIG. 5E.

Figure 6:
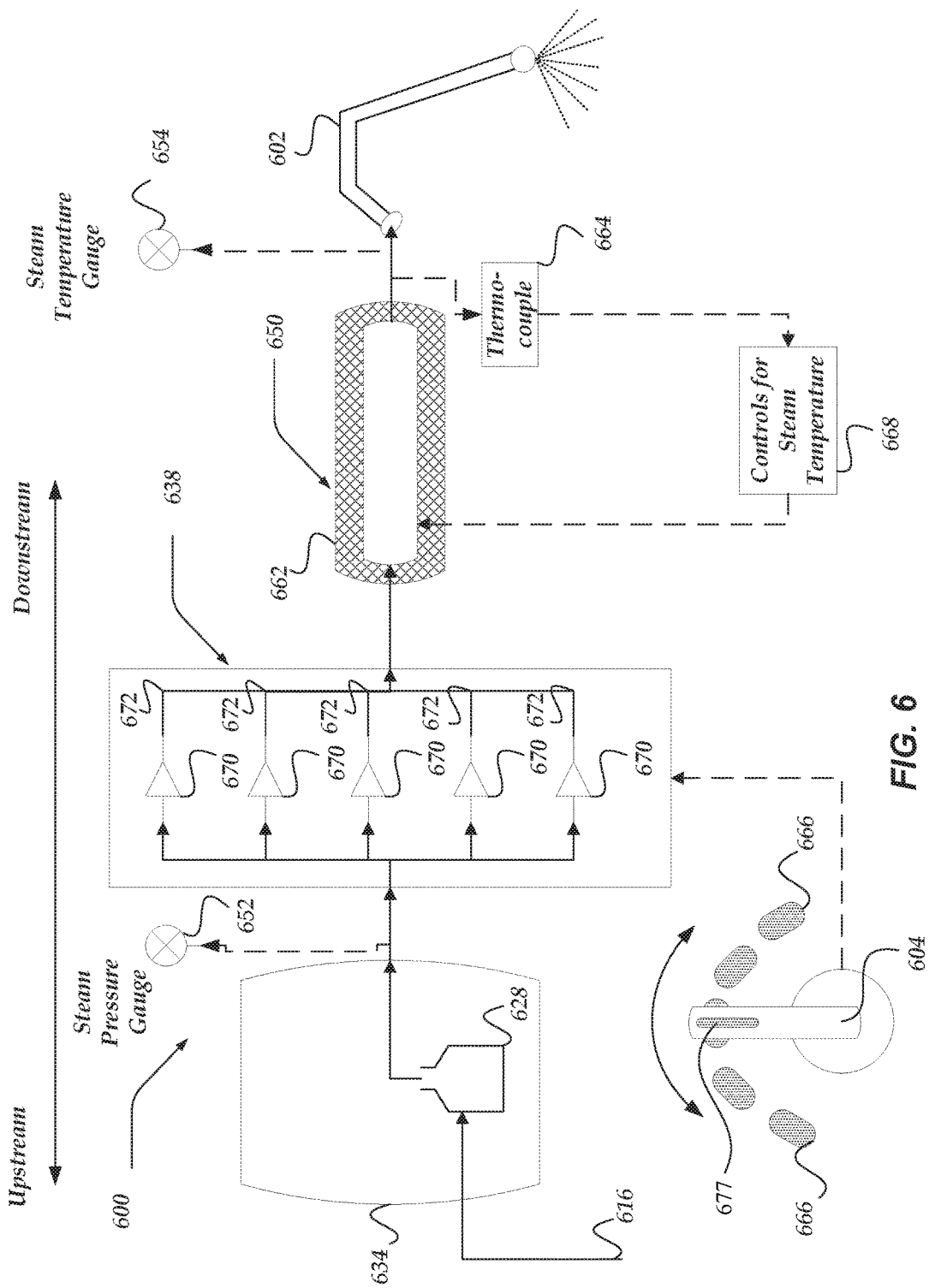
FIG. 6 illustrates a portion of another embodiment of an espresso machine that generates superheated steam and is consistent with the various embodiments described herein.

FIG. 6 illustrates a portion of another embodiment of an espresso machine 600 that generates superheated steam and is consistent with the various embodiments described herein. Espresso machine 600 of FIG. 6 may include similar features, components, and/or functionality of the various embodiments described herein, including, but not limited to espresso machine 100 of FIG. 1 or espresso machine 200 of FIG. 2. The upstream/downstream coordinate system is shown in the upper portion of FIG. 6.

Espresso machine 600 includes water supply 616, steam tank 634, and steam heating source 628. In various embodiments, the steam heating source may be housed in steam tank 634. The combination of steam heating source 628 and steam tank 634 may form a boiler system that generates wet steam from water supplied by water supply 616.

Espresso machine 600 includes a steam flow rate regulating assembly 638 and controls for steam generation and flow rate 604. For instance, controls for steam generation and flow rate 604 may include a steam handle, such as but not limited to steam handle 104 of espresso machine 100. A steam handle may include one or more magnets 677. Espresso machine 600 may also include one or more other magnets 666 that oppose magnet 677. As used herein, two opposing magnet have their poles anti-aligned such that the north pole of the first magnet is in substantial alignment with the south pole of the second magnet and/or the south pole of the first magnet is in substantial alignment with the north pole of the second magnet. Accordingly, a pair of opposing and/or anti-aligned magnets induce a mutually attractive force. While a pair of aligned magnets induce a mutually repelling force. Thus, the terms opposing refers to the anti-alignment of the poles of two magnets.

When two magnets are brought near one another and into opposition (or anti-alignment), the opposing magnets provide tactile feedback for the smooth and precise control of the flow rate of steam, due the mutually attractive force between the magnets. For instance, when the steam handle included in controls for steam generation and flow rate 604 is rotated such that magnet 677 passes near one of the opposing magnet of magnets 666, the opposing magnet provides an attractive force that provides a "snapping into place" experience for the user. Although not shown in FIG. 6, espresso machine 600 may include one or more magnetic switches to sense a position of steam handle 604 and provide a positioning signal to flow rate regulating assembly 638. Such magnetic switches enable the automatic sensing and detection of the user's control (rotation) of steam handle 604.

Steam flow rate regulating assembly 638 may include one or more valves 670. The one or more valves 670 may regulate the flow of the wet steam from the steam tank 634 through one or more steam flow paths 672. The controls for steam generation and flow rate 604 may control the one or more valves 670. In at least one embodiment, the one or more valves 670 may include at least one proportional valve. The opening and closing of the one or more valves 670 may be pulsed. The frequency of the pulsing may be controlled, varied, and/or regulated via the controls for steam generation and flow rate 634 to control, vary, and/or regulate the flow rate of steam.

Espresso machine 600 may include a steam super-heater assembly 650 that is downstream from the steam flow rate regulating assembly 638 and completes the vaporization of the wet steam. Accordingly, the wet steam flows downstream from the steam flow rate regulating assembly 638 to the steam super-heater assembly 650, where superheated steam is generated from the wet steam. Steam super-heater assembly 650 may include similar features, components, or functionality to any of the steam super-heater assemblies discussed herein, including but not limited to steam super-heater assemblies 300, 400, and 500 of FIGS. 3-5B. In at least one embodiment, a thermal insulating layer 662, such as but not limited to a thermal insulating blanket or foam, may at least partially insulate the steam super-heater assembly 650 from the ambient temperature to increase the efficiency of the steam super-heater assembly 650.

Espresso machine 600 may include controls for steam temperature 668, a steam pressure gauge, 652, and a steam temperature gauge 654. Controls for steam temperature may include one or more controllers. The one or more controllers may include a processor device, such as a microcontroller, a microprocessor, a central processing unit (CPU), or the like. A controller may include a logic device, such as but not limited to an application specific integrated circuit (ASIC), field programmable gate array (FPGA), or the like.

Furthermore, espresso machine 600 may include one or more thermocouples 664. The thermocouple 664 may be in thermal contact with at least a portion of the super-heater assembly. The thermocouple 664 may be enable to generate a signal based on a temperature of a portion of the super-heater assembly. As shown in FIG. 6, controls for steam temperature 668 may receive the signal. The controls for steam temperature 668 may adjust a temperature of the heating element based on a difference between the temperature of the portion of the super-heater assembly and a temperature threshold. Accordingly, the controls for steam temperature 668 and thermocouple 664 may work together to generate and respond to thermostatic feedback. The superheated steam may be outputted from espresso machine 600 via steam wand 602.

Methods for Preparing Beverages and Generating Superheated Steam

Figure 7A:
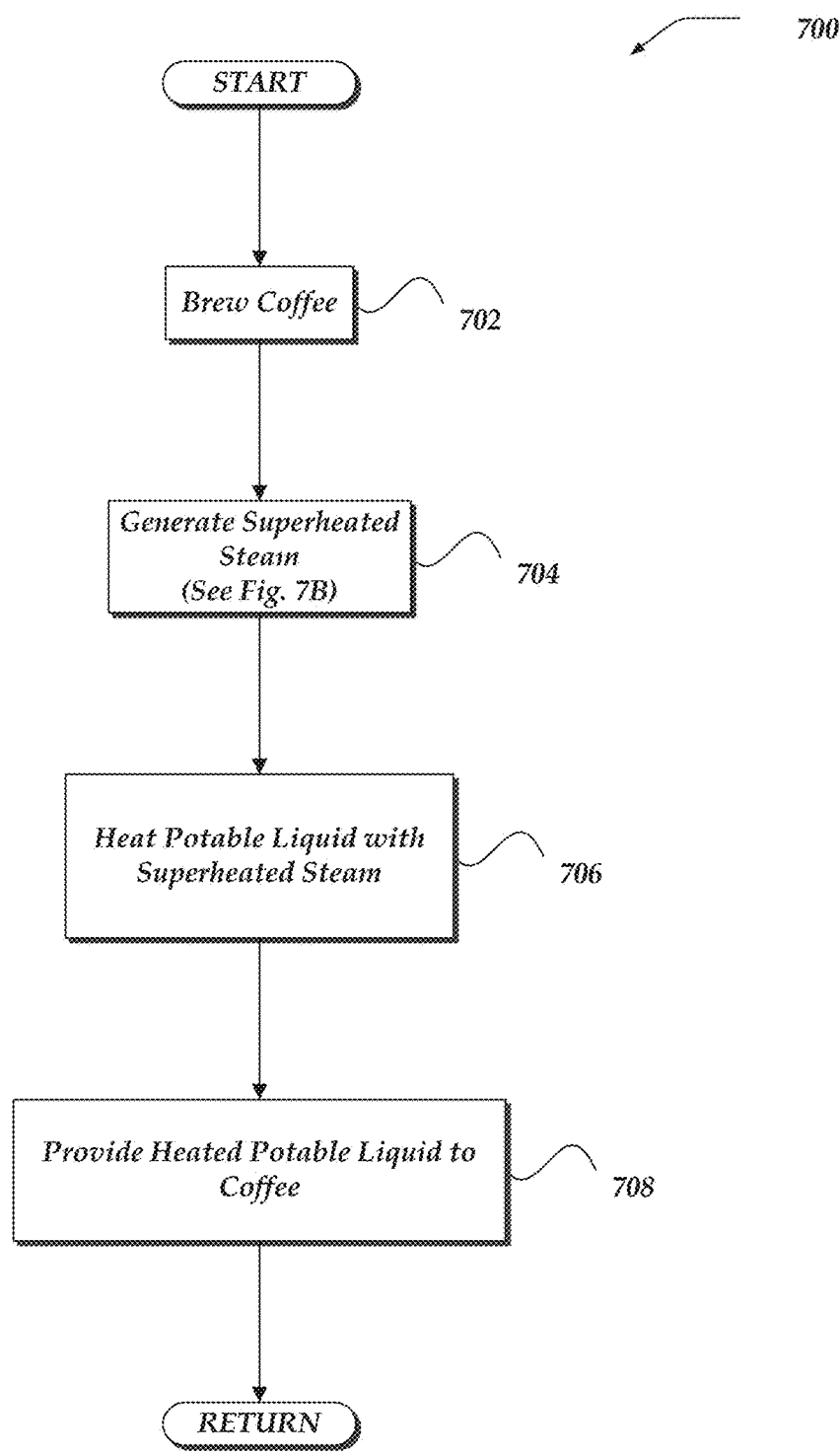
FIG. 7A illustrates a logical flow diagram showing one embodiment of a process for preparing a coffee-based beverage that is consistent with the various embodiments described herein.
Figure 7B:
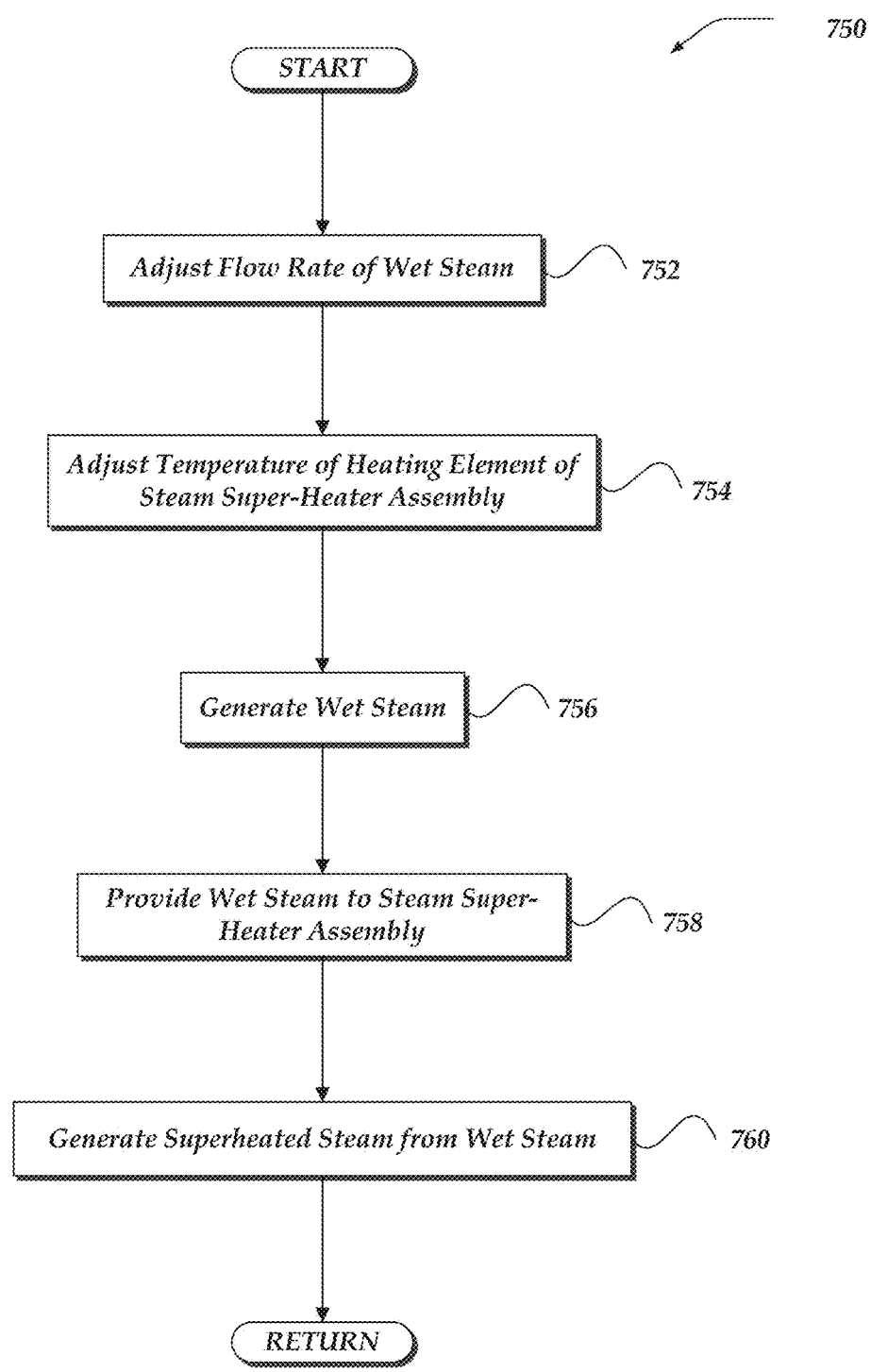
FIG. 7B illustrates a logical flow diagram showing one embodiment of a process for generating superheated steam in the preparation of a coffee-based beverage that is consistent with the various embodiments described herein.

Various embodiments of processes 700 and 750 of FIGS. 7A-7B may be directed towards the preparation of coffee-based beverages. However, other embodiments are not so constrained, and may be employed in the preparation of other beverages, such as but not limited to tea-based beverages, chai-based beverages, and the like. FIG. 7A illustrates a logical flow diagram showing one embodiment of a process for preparing a coffee-based beverage that is consistent with the various embodiments described herein. Process 700 begins, after a start block, at block 702 where coffee is brewed. Brewing coffee is discussed throughout. However briefly, brewing coffee at block 702 may include, but is not otherwise limited to brewing one or more shots of espresso. Coffee grounds may be pre-wetted at a first flow rate. The one or more shots of espresso may be brewed by providing the pre-wetted coffee grounds water at a second flow rate. The second flow rate may be greater than the first flow rate. Brewing coffee at block 702 may include brewing a first volume of coffee.

At block 704, superheated steam is generated. Various embodiments of generating superheated steam are discussed throughout, including at least in conjunction with process 750 of FIG. 7B. However, briefly, at block 704, superheated steam may be generated in at least a two step process. For instance, first, wet steam may be generated in a steam tank. Generating wet steam may include generating partially vaporized fluid. The wet steam may be provided to a downstream steam super-heater assembly. The wet steam may be further dried and heated in the super-heater assembly to convert the wet steam into superheated steam. Generating superheated steam may include further vaporizing the partially vaporized fluid. At least a portion of the wet steam may be converted into dry steam. Superheated and/or dry steam may include further vaporized fluid. Such a steam super-heater assembly may include, but is not otherwise limited to the various steam super-heater assemblies discussed herein.

At block 706, a potable liquid may be heated and/or frothed with the superheated steam. The potable liquid may include, but is not otherwise limited to dairy-based milk, soy-based milk, rice-based milk, almond-based milk, hemp-based milk, coconut-based milk, cashew-based milk, or the like. For instance, a steam wand, such as but not limited to steam wand 102 of espresso machine 100 of FIG. 1 or steam wand 602 of espresso machine 600 of FIG. 6 may be used to provide the superheated steam to the potable liquid.

At block 708, the heated and/or frothed potable liquid may be provided to the coffee brewed at block 702. Process 700 may terminate after block 708.

FIG. 7B illustrates a logical flow diagram showing one embodiment of a process for generating superheated steam in the preparation of a coffee-based beverage that is consistent with the various embodiments described herein. Process 750 begins after a start block 752, where the flow rate of wet steam is adjusted. The flow rate may be between a steam tank and a steam super-heater assembly, such as but not limited to steam tank 234 and steam super-heater assembly 250 of espresso machine 200 of FIG. 2, or steam tank 634 and steam super-heater assembly 650 of espresso machine of FIG. 6.

In at least one embodiment, the flow rate may be adjusted by a user of an espresso machine via steam flow rate controls. Such steam flow rate controls include, but is not otherwise limited steam handle 104 of espresso machine 100 of FIG. 1, controls for steam generation and flow rate 204 of espresso machine 200, or steam handle 604 of espresso machine 600.

In some embodiments, adjusting the flow rate may be enabled via employing a steam flow rate regulating assembly, such as but not limited to steam flow rate regulating assembly 238 of espresso machine 200 or steam flow rate regulating assembly 638 of espresso machine 600. In at least one embodiments, adjusting the flow rate may include regulating the flow rate by controlling one or more valves positioned intermediate a steam tank and a steam super-heater assembly. The one or more valves may regulate the flow rate through one or more flow paths.

At block 754, the temperature of a heating element of a steam super-heater assembly may be adjusted. The temperature of the heating element may be adjusted based on a type of the potable liquid that is being steamed and/or frothed. By adjusting the temperature of the heating element, the temperature of the superheated steam is adjusted. For instance, some types of potable liquid, such as dairy-based milk may be steamed and/or frothed with super-heated steam at a different temperature than the temperature of the super-heated steam that is employed to steam and/or froth soy-based milk. Thus, the temperature of the superheated steam may be adjusted to increase the consuming experiences of different types of milk to steam and/or froth.

At block 754, the temperature may be adjusted via one or more controls or controllers, such as but not limited to controls for steam temperature 668 of espresso machine 600. Adjusting the temperature of the heating element may control or adjust a moisture content of the superheated steam to be generated. For instance, above a threshold temperature, the super-heater assembly may fully vaporize steam within it. Thus, at block 754, the temperature of the heating element may be adjusted such that the temperature is greater than a vaporization temperature of water at a pressure of the super-heater assembly. A thermocouple may be employed to control the temperature of the heating element, such as but not limited to thermocouple 664 of espresso machine 600.

At block 756, wet steam is generated, as discussed herein. Generating wet steam may occur in one or more steam tanks included in an espresso machine. For instance, generating wet steam may include partially vaporizing a fluid housed within the steam tank.

At block 758, the wet steam or partially vaporized fluid is provided to a steam super-heater assembly. Such steam super-heater assemblies are discussed throughout, and include but are not otherwise limited to steam super-heater assembly 250, 300, 400, 500, 650, and the like, discussed in conjunction with at least FIGS. 2-6. Providing the wet steam to a steam super-heater assembly may include transmitting wet steam from the steam tank to the steam super-heater assembly.

At block 760, superheated steam is generated from the wet steam. In at least one embodiment, the superheated steam may be generated via a heat exchange process from a heating element in the steam super-heater assembly to the wet steam. Generating superheated steam at block 760 may include drying out the wet steam within the steam super-heater assembly via a heat exchange process between a heating element of the super-heater assembly and the wet steam. According, generating superheated steam may include generating dry steam. The superheated steam may be a temperature that is greater than the boiling or vaporization temperature of a fluid at the pressure within the super-heater assembly.

The above specification, examples, and data provide a description of the composition, manufacture, and use of the invention. Since many embodiments of the invention can be made without departing from the spirit and scope of the invention, the invention resides in the claims hereinafter appended.

The embodiments of the invention in which an exclusive property or privilege is claimed are defined as follows:

1. A method for employing a machine for a preparation of a beverage, the method comprising:
   partially vaporizing a fluid housed within a tank included in the machine by heating the fluid to a vaporizing temperature, wherein a portion of the fluid is transformed to vapor and a portion of the fluid remains in a liquid state;
   providing the partially vaporized fluid to a super-heater assembly included in the machine and, wherein the super-heater assembly is downstream from the tank and includes a helical member that surrounds a heating element, the helical member receiving the provided partially vaporized fluid;
   employing the super-heater assembly to further vaporize the fluid by exposing the partially vaporized fluid in the helical member to the heating element to produce further vaporized fluid, the further vaporized fluid containing a greater portion of vapor than in the partially vaporized fluid; and providing the further vaporized fluid to a heat or froth a milk product.

2. The method of claim 1, wherein the employing the super-heater assembly to further vaporize the fluid causes a heat transfer from the heating element to the fluid within the helical member to heat the partially vaporized fluid above the vaporizing temperature.

3. The method of claim 1, wherein the super-heater assembly further includes a body, wherein at least the heating element, the helical member, and the body form at least a portion of the flow path, the helical member positioned intermediate the heating element and the body, and wherein the helical member directs the received partially vaporized fluid along a concentric path about a longitudinal axis of the body to increase a total amount of thermal energy transferred to the partially vaporized fluid.

4. The method of claim 1, further comprising:
brewing one or more shots of espresso; and
combining the heated potable liquid with the one or more shots of espresso.

5. The method of claim 1, wherein at least a portion of the further vaporized fluid includes superheated steam.

6. The method of claim 1, further comprising at least one of:
adjusting a flow rate of the partially vaporized fluid from the tank to the super-heater assembly; or
adjusting a moisture content of the further vaporized fluid that is provided to the potable liquid by adjusting a temperature of a portion of the super-heater assembly.

7. The method of claim 6, wherein the flow rate of the partially vaporized fluid from the tank to the super-heater assembly is adjusted by controlling one or more valves positioned downstream from the tank and upstream from the super-heater assembly.

8. A method for generating superheated steam within an espresso machine, the method comprising:
generating unsaturated steam within a steam tank included in the espresso machine;
transmitting the unsaturated steam from the steam tank to a super-heater included in the espresso machine, wherein the super-heater is downstream from the steam tank and includes a body, a heating element, and a helical member that defines a flow path within the body, wherein the body is separate from the steam tank;
superheating the unsaturated steam in the flow path by transferring thermal energy generated within the body using the heating element to the unsaturated steam; and
providing the superheated steam to heat or froth milk.

9. The method of claim 8, further comprising:
employing the espresso machine, pre-wetting coffee grounds at a first flow rate of water provided to the coffee grounds; and
employing the espresso machine, brewing one or more shots of espresso from the pre-wetted coffee grounds at a second flow rate of water provided to the pre-wetted coffee grounds, wherein the second flow rate is greater than the first flow rate.

10. The method of claim 8, wherein the heating element is positioned within the body and is surrounded by the helical member to form at least a portion of the flow path such that when the unsaturated steam flows through the flow path, at least a portion of the unsaturated steam is in direct physical contact with the heating element.

11. The method of claim 8, further comprising:
adjusting a flow rate of the transmitting of the unsaturated steam from the steam tank to the super-heater by employing a flow rate regulating assembly included in the espresso machine.

12. The method of claim 11, wherein a movable control member of the flow rate regulating assembly includes one or more opposing magnets to provide the user with tactile feedback by inducing a mutually attractive force between the movable control member and one of one or more opposing magnets as the movable control member is moved towards the one of the one or more opposing magnets to cause a sensation that the control member is being snapped into place.

13. The method of claim 8, wherein the helical member of the super-heater is intermediate the heating element and the body, wherein the body, the helical member, and the heating element are coaxial about a longitudinal axis of the body, and wherein the superheating the unsaturated steam in the flow path by transferring thermal energy generated within the body to the unsaturated steam further comprises:
directing the unsaturated steam along the helical member of the super-heater to expose the unsaturated steam to the heating element to superheat the unsaturated steam by transferring thermal energy from the heating element.

14. The method of claim 8, further comprising: controlling a temperature of the superheating the unsaturated steam in the flow path using one or more thermocouples downstream from the steam tank.

15. A method for preparing a coffee-based beverage, the method comprising:
brewing a volume of coffee;
generating steam in a steam tank;
providing the steam to a super-heater assembly located downstream from the steam tank;
employing the super-heater assembly to heat at least a portion of the steam to a temperature that is greater than a vaporization temperature of water at a pressure of the super-heater assembly;
providing the heated steam to heat or froth milk; and
combining at least a portion of the heated or frothed milk with the volume of coffee.

16. The method of claim 15, wherein the providing the steam to a super-heater assembly and the employing the super-heater assembly to heat at least a portion of the steam further comprises:
providing the steam to a body of the super-heater assembly through an input of the body of the super-heater assembly, wherein the input enables fluid access into an internal cavity of the body, and wherein the body includes an output that enables fluid egress out of the internal cavity; and
heating the at least a portion of the steam using a heating element that includes one or more heating surfaces positioned within the internal cavity of the body of the super-heater assembly to heat the portion of the steam, wherein the heating element is configured and arranged to heat the one or more heating surfaces, and wherein a flow path within the internal cavity of the body enables fluid to flow from the input, through the internal cavity of the body, and to the output of the body, wherein at least a portion of the one or more heating surfaces of the heating element form at least a portion of the flow path such that when the fluid flows through the internal cavity of the body, at least a portion of the fluid is in direct physical contact with the one or more heating surfaces.

17. The method of claim 16, further comprising:
employing the super-heater assembly to heat at least a portion of the steam using a helical member positioned within the internal cavity of the body of the super-heater assembly, wherein at least a portion of the helical member forms another portion of the flow path such that the flow path is a helical flow path.

18. The method of claim 17, further comprising:
employing the super-heater assembly to heat at least a portion of the steam, wherein the body, the heating element, and the helical member are concentrically arranged about a longitudinal axis of the body of the super-heater assembly such that the helical member is laterally intermediate the body and the heating element.

19. The method of claim 15, further comprising:
regulating a flow rate of the heated steam provided to the user by controlling one or more valves positioned intermediate a steam tank that generates the steam and the super-heater assembly.

20. The method of claim 15, further comprising:
employing a thermocouple to control the temperature of the heated steam that is greater than the vaporization temperature of water at the pressure of the super-heater assembly.

* * * * *

UNITED STATES PATENT AND TRADEMARK OFFICE
CERTIFICATE OF CORRECTION

PATENT NO. : 9,918,583 B2
APPLICATION NO. : 15/499094
DATED : March 20, 2018
INVENTOR(S) : Jason Camille Prefontaine et al.

It is certified that error appears in the above-identified patent and that said Letters Patent is hereby corrected as shown below:

In the Claims

In Column 25, Line 1 (Claim 1), remove the first occurrence of the word "a".

Signed and Sealed this
Thirty-first Day of July, 2018

Andrei Iancu
*Director of the United States Patent and Trademark Office*